US012076999B2

(12) United States Patent
Osakabe et al.

(10) Patent No.: US 12,076,999 B2
(45) Date of Patent: Sep. 3, 2024

(54) LIQUID-CONSUMING APPARATUS

(71) Applicant: BROTHER KOGYO KABUSHIKI KAISHA, Nagoya (JP)

(72) Inventors: Yoshinori Osakabe, Seto (JP); Tomohisa Higuchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/303,743

(22) Filed: Apr. 20, 2023

(65) Prior Publication Data

US 2023/0391098 A1 Dec. 7, 2023

Related U.S. Application Data

(60) Continuation of application No. 17/396,818, filed on Aug. 9, 2021, now Pat. No. 11,633,955, which is a (Continued)

(30) Foreign Application Priority Data

Sep. 30, 2014 (JP) ................................. 2014-201864

(51) Int. Cl.
*B41J 2/175* (2006.01)
*B41J 2/165* (2006.01)
(Continued)

(52) U.S. Cl.
CPC ....... *B41J 2/17553* (2013.01); *B41J 2/16505* (2013.01); *B41J 2/17513* (2013.01); (Continued)

(58) Field of Classification Search
CPC ................ B41J 2/17553; B41J 2/16505; B41J 2/17513; B41J 2/1752; B41J 2/1754; (Continued)

(56) References Cited

U.S. PATENT DOCUMENTS 5,686,947 A 11/1997 Murray et al.
6,099,115 A 8/2000 Faoro
(Continued)

FOREIGN PATENT DOCUMENTS

CN 203158445 U 8/2013
CN 103660591 A 3/2014
(Continued)

OTHER PUBLICATIONS

Notice of Allowance issued in related U.S. Appl. No. 15/845,001, filed Dec. 26, 2018.

(Continued)

*Primary Examiner* — Lisa Solomon
(74) *Attorney, Agent, or Firm* — Merchant & Gould P.C.

(57) ABSTRACT

An ink-jet printer includes: a tank including an ink storage chamber and an inlet; a cap which is detachably attachable to the inlet; a cover configured to move between a first position and a second position farther from the inlet than the first position; and an arm configured to locate the cap at an inlet closing position and an inlet opening position. Under a condition that the cap is in the inlet opening position and the cover is in the second position, the arm holds the cap in a state that the cap does not contact with the cover. Under a condition that the cap is in the inlet opening position, a part of at least one of the cap and the arm is in the moving locus of the cover between the first position and the second position.

19 Claims, 15 Drawing Sheets

Related U.S. Application Data continuation of application No. 16/812,449, filed on Mar. 9, 2020, now Pat. No. 11,084,295, which is a continuation of application No. 16/363,470, filed on Mar. 25, 2019, now Pat. No. 10,583,663, which is a continuation of application No. 16/004,668, filed on Jun. 11, 2018, now Pat. No. 10,239,324, which is a continuation of application No. 15/611,960, filed on Jun. 2, 2017, now Pat. No. 9,994,034, which is a continuation of application No. 15/263,919, filed on Sep. 13, 2016, now Pat. No. 9,682,568, which is a division of application No. 14/854,203, filed on Sep. 15, 2015, now Pat. No. 9,463,633.

(51) Int. Cl.
*B41J 29/02* (2006.01)
*B41J 29/13* (2006.01)

(52) U.S. Cl.
CPC .......... *B41J 2/1752* (2013.01); *B41J 2/1754* (2013.01); *B41J 29/02* (2013.01); *B41J 29/13* (2013.01); *B41J 2/165* (2013.01); *B41J 2/16511* (2013.01); *B41J 2/175* (2013.01)

(58) Field of Classification Search
CPC ........... B41J 29/02; B41J 29/13; B41J 2/165; B41J 2/16511; B41J 2/175
See application file for complete search history.

(56) References Cited

U.S. PATENT DOCUMENTS

| | | | |
|---|---|---|---|
| 6,276,788 | B1 | 8/2001 | Hilton |
| 6,547,363 | B1 | 4/2003 | Shinada |
| 6,565,197 | B1 | 5/2003 | Murray et al. |
| 7,552,998 | B2 | 6/2009 | Yonekawa |
| 7,837,308 | B2 | 11/2010 | Yano |
| 8,905,504 | B2 | 12/2014 | Lizawa |
| 9,475,298 | B2 | 10/2016 | Osakabe |
| 9,844,947 | B2 | 12/2017 | Osakabe |
| 10,286,674 | B2 | 5/2019 | Osakabe |
| 10,363,762 | B2 | 7/2019 | Takabayashi |
| 10,766,266 | B2 | 9/2020 | Osakabe |
| 2002/0092875 | A1 | 7/2002 | Rho |
| 2005/0174408 | A1 | 8/2005 | Qingguo et al. |
| 2005/0179755 | A1 | 8/2005 | Murakami et al. |
| 2009/0033707 | A1 | 2/2009 | Shimazaki |
| 2013/0169720 | A1 | 7/2013 | Nakamura et al. |
| 2013/0314479 | A1 | 11/2013 | Nozawa |
| 2014/0022314 | A1 | 1/2014 | Nozawa et al. |
| 2014/0043408 | A1 | 2/2014 | Kudo et al. |
| 2014/0063139 | A1 | 3/2014 | Iwamuro et al. |
| 2014/0063147 | A1 | 3/2014 | Iwamuro et al. |
| 2015/0352853 | A1 | 12/2015 | Kudo et al. |
| 2016/0009098 | A1 | 1/2016 | Kimura et al. |
| 2016/0089893 | A1 | 3/2016 | Osakabe et al. |

FOREIGN PATENT DOCUMENTS

| | | | |
|---|---|---|---|
| JP | 51-25208 | Y | 6/1976 |
| JP | 9-30001 | A | 2/1997 |
| JP | 11-504874 | A | 5/1999 |
| JP | 2013-949 | A | 1/2013 |
| JP | 2013-212706 | A | 10/2013 |
| JP | 2013-226726 | A | 11/2013 |
| JP | 2013-226728 | A | 11/2013 |
| JP | 2014-46624 | A | 3/2014 |
| JP | 2014-61692 | A | 4/2014 |
| WO | 2014/112344 | A | 7/2014 |
| WO | 2014/132614 | A | 9/2014 |

OTHER PUBLICATIONS

Office Action issued in related Chinese Patent Application No. 201510514790.X, Oct. 24, 2018.
IP.com search (Year: 2018).
Office Action issued in related U.S. Appl. No. 15/845,001, filed Aug. 30, 2018.
Office Action, (Notice of Reasons for Rejection) issued in related Japanese Patent Application No. 2014-201864, mailed Jul. 24, 2018.
Related U.S. Appl. No. 15/000,545, filed Jan. 19, 2016.
International Search Report issued in related International Application PCT/JP2016/000253, mailed Apr. 12, 2016.
Written Opinion issued in related International Application PCT/JP2016/000253, mailed Apr. 12, 2016.
U.S. Office Action (Notice of Allowance) issued in related U.S. Appl. No. 15/000,545 mailed Jun. 22, 2016.
U.S. Office Action (Restriction Requirement) issued in related U.S. Appl. No. 14/854,203, mailed Mar. 14, 2016.
U.S. Office Action (Notice of Allowance) issued in related U.S. Appl. No. 14/854,203, mailed Jun. 13, 2016.
U.S. Office Action (Corrected Notice of Allowability) issued in related U.S. Appl. No. 14/854,203, mailed Aug. 15, 2016.
Related U.S. Appl. No. 15/293,585, as filed.
Non-Final Office Action issued in related U.S. Appl. No. 15/293,585, filed May 2, 2017.
U.S. Office Action issued in related U.S. Appl. No. 15/293,585, filed Aug. 18, 2017.
Office Action issued in related Chinese Patent Application No. 201510514790.X, mailed Feb. 13, 2018.
IP.com search (Year: 2019).
Office Action issued in corresponding Indian Patent Application No. 201717024031, Dec. 10, 2019.
Office Action issued in related U.S. Appl. No. 16/407,265, filed Jan. 21, 2020.
U.S. Office Action issued in related U.S. Appl. No. 16/407,265, mailed Jan. 21, 2020.
Notice of Allowance issued in related U.S. Appl. No. 16/363,470, filed Oct. 8, 2019.
U.S. office action issued in related U.S. Appl. No. 16/004,668, mailed Jul. 16, 2018.
U.S. Office Action (Corrected Notice of Allowance) issued in related U.S. Appl. No. 15/611,960, mailed Apr. 25, 2018.
U.S. Office Action (Notice of Allowance) issued in related U.S. Appl. No. 15/611,960, mailed Feb. 12, 2018.
Related U.S. Appl. No. 14/854,203, filed Sep. 15, 2015.
Notice of Allowance issued in related U.S. Appl. No. 16/407,265, filed May 1, 2020.
Notification of First Office Action issued in corresponding Chinese Patent Application No. 201910640503.8, May 11, 2020.
Office Action issued in related Philippine Patent Application No. 1-2017-501299, Jul. 4, 2020 (4 pages).
Notice of Allowance issued in parent U.S. Appl. No. 16/812,449 on Apr. 5, 2021.
IP.com search (Year: 2021).
Office Action issued in related U.S. Appl. No. 17/012,213, filed Nov. 5, 2021.
IP.com search (Year: 2022).
Office Action issued in related U.S. Appl. No. 17/716,406, filed Nov. 28, 2022.
Notice of Allowance issued in U.S. Appl. No. 17/396,818 on Dec. 12, 2022.
Non-Final Office Action issued in the related U.S. Appl. No. 18/465,322, filed May 3, 2024.

LIQUID-CONSUMING APPARATUS

REFERENCE TO RELATED APPLICATIONS

The present application is a continuation of U.S. patent application Ser. No. 17/396,818, filed Aug. 9, 2021, which is a continuation of U.S. patent application Ser. No. 16/812,449, filed Mar. 9, 2020, which is a continuation of U.S. patent application Ser. No. 16/363,470, filed Mar. 25, 2019, which is a continuation of U.S. patent application Ser. No. 16/004,668 filed Jun. 11, 2018, which is a continuation of U.S. patent application Ser. No. 15/263,919 filed Jun. 2, 2017, which is a continuation of U.S. patent application Ser. No. 15/263,919 filed Sep. 13, 2016, which is a divisional of U.S. patent application Ser. No. 14/854,203, filed Sep. 15, 2015, which further claims priority from Japanese Patent Application No. 2014-201864, filed on Sep. 30, 2014, the disclosures of all of which are incorporated herein by reference in their entirety.

BACKGROUND ART

Field of the Invention

The present invention relates to a liquid-consuming apparatus including a tank with an inlet for liquid, a cap to cover the inlet of the tank, and a cover which makes it possible or impossible for a user to access the tank.

Description of the Related Art

There is conventionally known a printer (an exemplary liquid-consuming apparatus) having a capacious tank which can be replenished with ink and a recording head which discharges the ink supplied from the tank from nozzles to record an image on a recording sheet. The tank has an inlet for the ink, and the inlet can be opened or covered with a cap. The ink can be poured into the tank through the inlet from which the cap is removed.

DESCRIPTION

Summary of the Invention

By the way, when a user supplies the ink to the tank, the user may put the cap removed from the inlet on a placement surface such as a desk. This could dirty the placement surface due to the adhesion of the ink. Further, the user could lose the removed cap. If the user forgets to cover the inlet with the cap after supplying the ink, the printer will be used in a state that the inlet of the tank is open. In such a case, there is fear that the viscosity of ink and the like might change due to the evaporation of moisture of the ink in the tank through the inlet, that dust and the like might enter into the tank through the inlet, and that the ink might leak from the inlet.

The present teaching has been made in view of the abovementioned circumstances, and an object of the present teaching is to provide a means by which a liquid-consuming apparatus is prevented from being used in a state that an inlet of a tank is not covered with a cap.

According to a first aspect of the present teaching, there is provided a liquid-consuming apparatus, including: a tank including a liquid storage chamber configured to store a liquid, an inlet formed in a surface of the tank, and an outlet configured to let the liquid flow therethrough from the liquid storage chamber; a cap configured to move between a first position and a second position, the first position being a position at which the cap is in an attached state, the second position being a position at which the cap is in a detached state, the attached state being a state in which the inlet is closed with the cap, the detached state being a state in which the inlet is open; a cover configured to be movable relative to the tank between a closed position and an open position, the closed position being a position where access to the cap is impossible, the open position being a position where the access to the cap is possible; and a holding member connected to the cap to hold the cap in the detached state at the second position, wherein under a condition that the cap is in the detached state at the second position, the cap or the holding member is configured to obstruct a movement of the cover from the open position to the closed position.

According to a second aspect of the present teaching, there is provided a liquid-consuming apparatus, including: a tank including a liquid storage chamber, an inlet formed in a surface of the tank, and an outlet formed below the inlet; a cap which is detachably attachable to the inlet; a cover configured to move relative to the tank between a closed position and an open position, the closed position being a position where the inlet is covered, the open position being a position where the inlet is exposed to an exterior of the tank; and a holding member made of an elastic deformable material, connected to the cap, and configured to hold the cap away from the tank by an elastic force against a self-weight of the cap in a detached state of the cap, wherein under a condition that the cap is in the detached state, the holding member is configured to hold the cap at a position where the cap or the holding member overlaps with a locus of the cover moving between the open position to the closed position.

Moving the cover to the open position enables a user to access the cap. Removing the cap from the inlet of the tank enables the user to replenish the tank with liquid. The cap removed from the inlet is held in the detached state at the second position by the aid of the holding member. This prevents the loss of the cap and the dirt or stain on a placement surface, which would be otherwise caused by putting the cap on the placement surface. When the user moves the cover from the open position to the closed position in a state that the cap is in the detached state at the second position, the cap in the detached state or the holding member obstructs or blocks the movement of the cover. This enables the user to know that the cap is not attached to the inlet.

According to the present teaching, holding the cap in the detached state by the aid of the holding member prevents the loss of the cap and the dirt or stain on the placement surface, which would be otherwise caused by putting the cap on the placement surface. Further, the cover is prevented from moving to the closed position by the cap in the detached state or the holding member. Thus, the liquid-consuming apparatus is prevented from being used in a state that the inlet of the tank is not covered with the cap.

BRIEF DESCRIPTION OF THE DRAWINGS

FIGS. 1A and 1B are perspective views of outer appearances of a multifunction peripheral, wherein FIG. 1A depicts a state that a cover is closed, and FIG. 1B depicts a state that the cover is open.

DESCRIPTION OF THE PREFERRED EMBODIMENTS

Figure 1A:
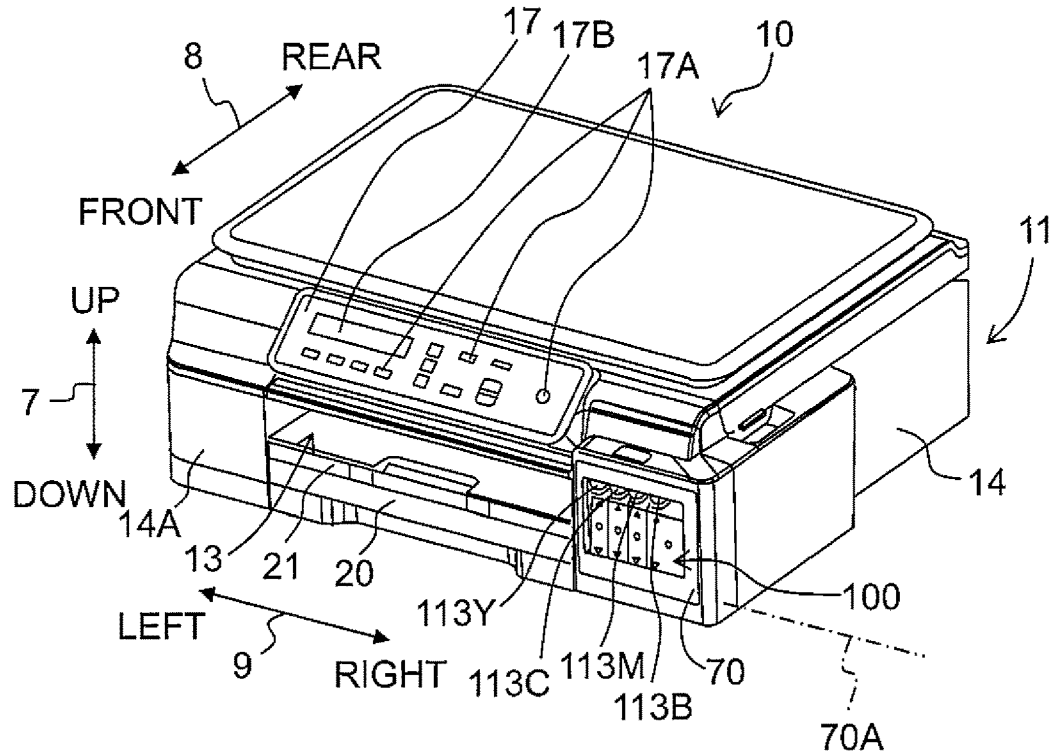

In the following, an explanation will be made about an embodiment of the present teaching. It is needless to say that the embodiment to be explained below is merely an example of the present teaching, and it is possible to appropriately change the embodiment of the present teaching without departing from the gist and scope of the present teaching. In the following explanation, the state in which a multifunction peripheral 10 is placed to be usable (the state depicted in FIGS. 1A and 1B) is described as "usable state". Further, the posture in which the multifunction peripheral 10 is placed to be usable (the posture depicted in FIGS. 1A and 1B) is described as "usable posture". An up-down direction 7 is defined on the basis of the usable state or usable posture. A front-rear direction 8 is defined as an opening 13 of the multifunction peripheral 10 is provided on the near side (the front side). A left-right direction 9 is defined as the multifunction peripheral 10 is viewed from the near side (the front side). The up-down direction 7 includes upward and downward directions as components thereof, and the upward direction is oriented against the downward direction. The left-right direction 9 includes leftward and rightward directions as components thereof, and the leftward direction is oriented against the rightward direction. The front-rear direction 8 includes frontward and rearward directions as components thereof, and the frontward direction is oriented against the rearward direction. Further, in this embodiment, the up-down direction 7 corresponds to a vertical direction and the front-rear direction 8 and the left-right direction 9 correspond to a horizontal direction.

<Entire Structure of Multifunction Peripheral 10>

Figure 1B:
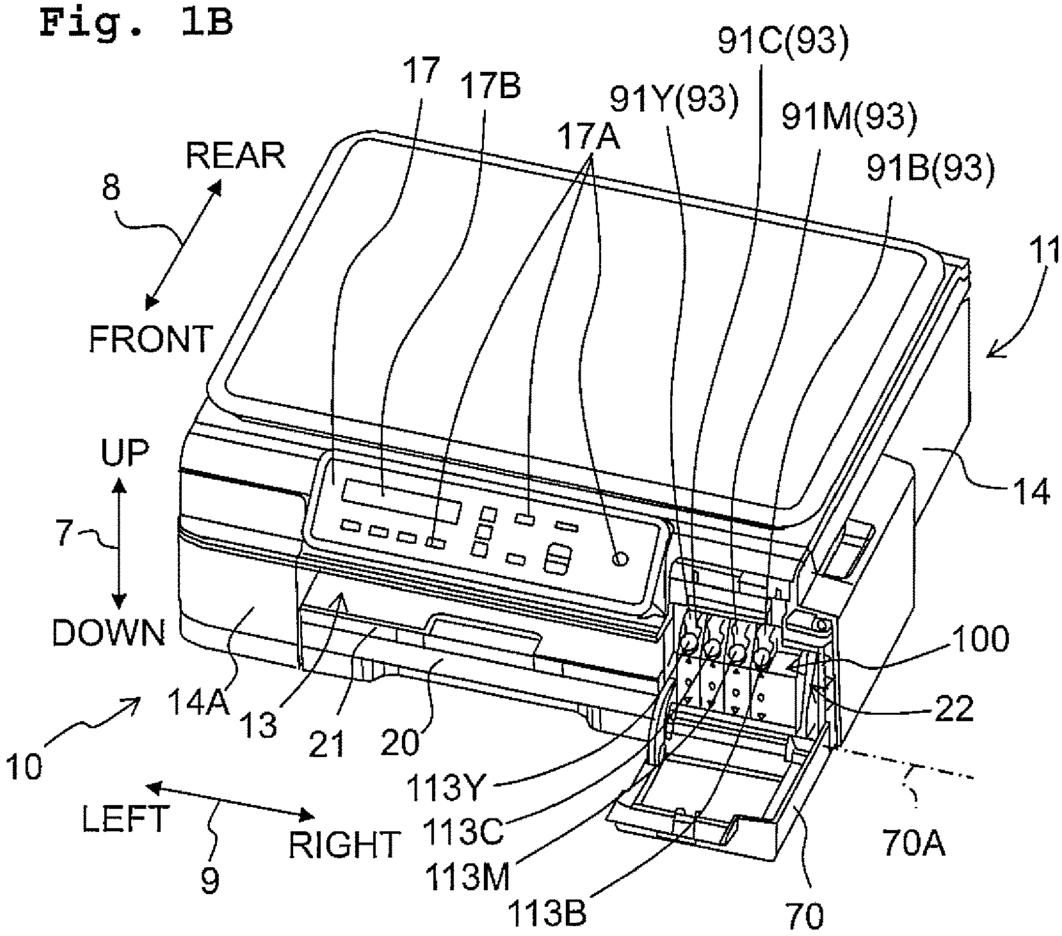
Figure 2:
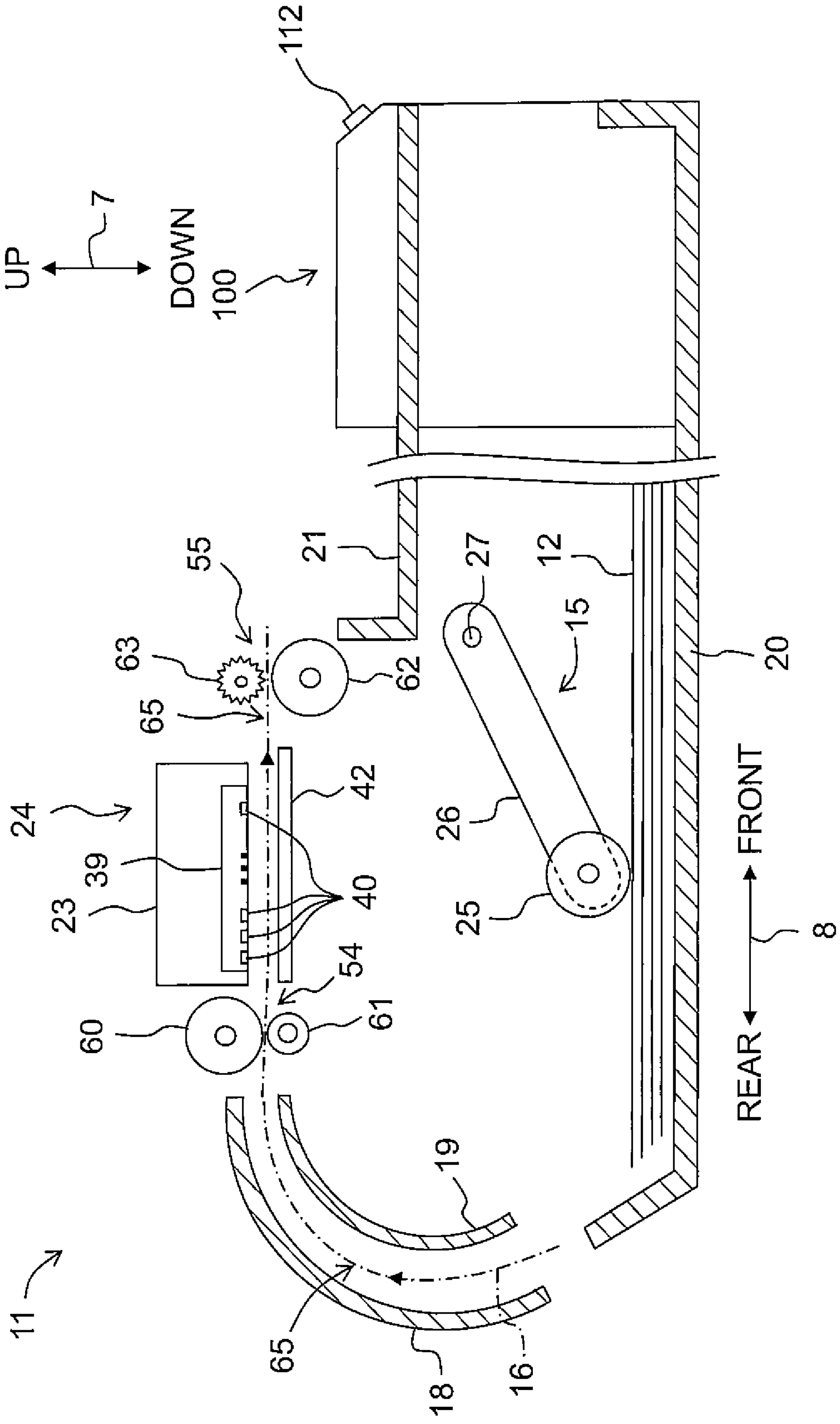
FIG. 2 is a vertical cross-sectional view schematically depicting the internal structure of a printer unit.

As depicted in FIGS. 1A and 1B, the multifunction peripheral 10 is formed to have an approximately cuboid form. A printer unit 11 of the ink-jet recording system is provided at a lower part of the multifunction peripheral 10 to record an image on a sheet 12 (see FIG. 2). As depicted in FIG. 2, the printer unit 11 includes a feed unit 15, a feed tray 20, a discharge tray 21, a conveyance roller unit 54, a recording unit 24, a discharge roller unit 55, a platen 42, and an ink tank 100 (an exemplary tank). The multifunction peripheral 10 includes various functions such as a facsimile function and a print function. The multifunction peripheral 10 is an exemplary liquid-consuming apparatus.

An operation panel 17 is provided on a front wall 14A of a housing 14 of the printer unit 11 to be positioned above the opening 13. The operation panel 17 includes input buttons 17A and a liquid crystal display 17B on the surface thereof. The operation panel 17 is configured to extend in the left-right direction 9, and the surface of the operation panel 17 faces obliquely upward. The operation panel 17 is disposed above the ink tank 100 which will be described later.

<Feed Tray 20, Discharge Tray 21>

As depicted in FIGS. 1A and 1B, the opening 13 is formed at the central part in the left-right direction 9 of the front surface of the multifunction peripheral 10. The feed tray 20 is inserted to and pulled or drawn out of the multifunction peripheral 10 by a user in the front-rear direction 8 via the opening 13. The feed tray 20 can support sheets 12 stacked thereon. The discharge tray 21 is disposed above the feed tray 20, and the discharge tray 21 is inserted to and pulled or drawn out of the multifunction peripheral 10 together with the feed tray 20. The discharge tray 21 supports each sheet 12 which is discharged by the discharge roller unit 55 from the space between the recording unit 24 and the platen 42.

<Feed Unit 15>

The feed unit 15 feeds each sheet 12 supported by the feed tray 20 to a conveyance path 65. As depicted in FIG. 2, the feed unit 15 includes a feed roller 25, a feed arm 26, and a shaft 27. The feed roller 25 is rotatably supported on the side of the forward end of the feed arm 26. The reverse rotation of a conveyance motor (not depicted) rotates the feed roller 25 in the direction in which the sheet 12 is conveyed in a conveyance direction 16. In the following, the rotations of the feed roller 25, the conveyance roller 60, and a discharge roller 62 in the direction in which the sheet 12 is conveyed in the conveyance direction 16 are described as "forward (normal) rotation". The feed arm 26 is swingably supported by the shaft 27 which is supported by a frame of the printer unit 11. The feed arm 26 is biased to swing toward the feed tray 20 by a self-weight or the elastic force of a spring or the like.

<Conveyance Path 65>

As depicted in FIG. 2, the conveyance path 65 is a path which extends from the rear end of the feed tray 20 toward the rear side of the printer unit 11, extends from the lower side to the upper side in the up-down direction 7 on the rear side of the printer unit 11 while being curved to make a U-turn, and passes through the space between the recording unit 24 and the platen 42 to arrive at the discharge tray 21.

Figure 3:
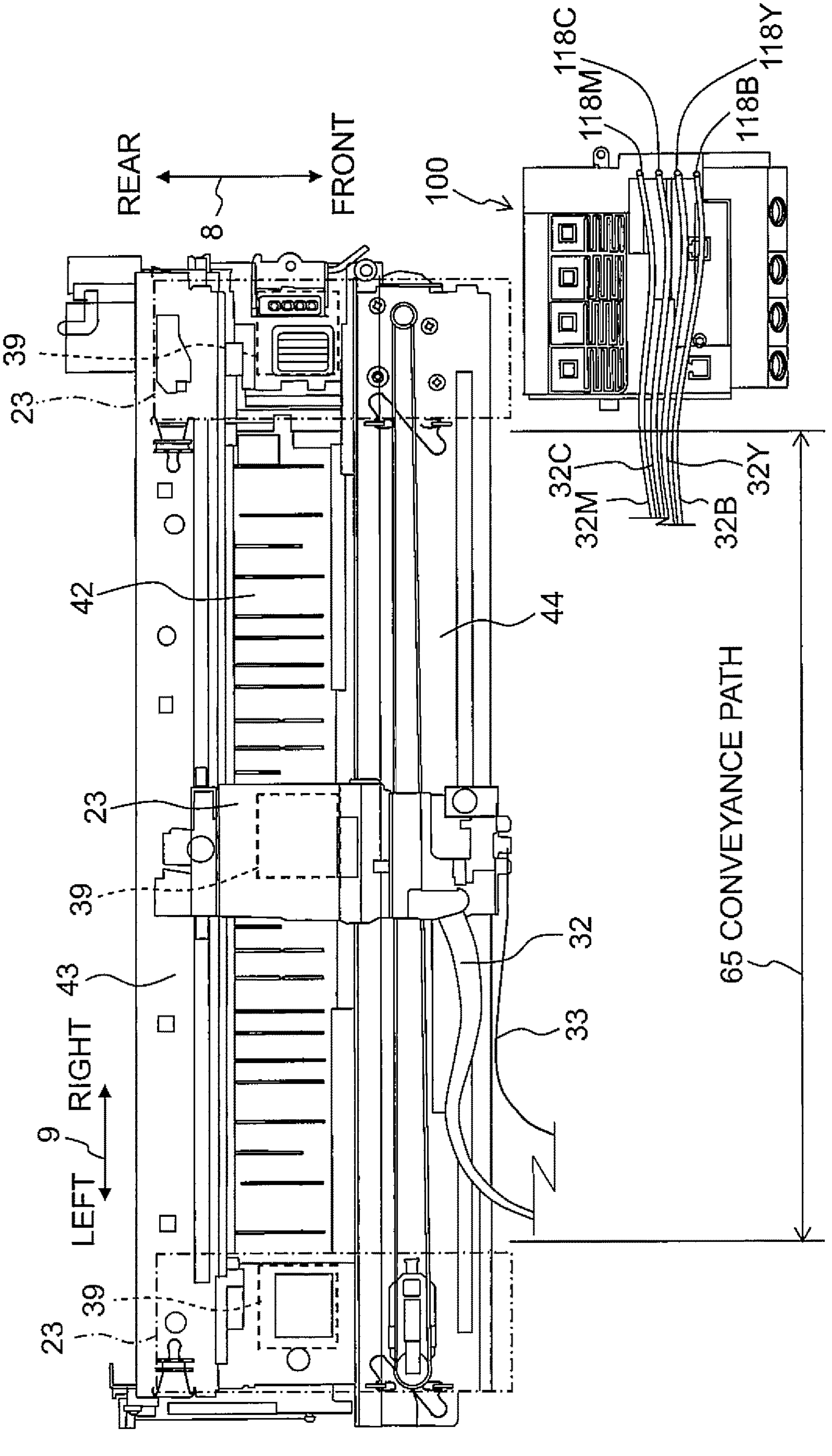
FIG. 3 is a plan view depicting the arrangement of a carriage and an ink tank.

A part of the conveyance path 65 is formed by an outer guide member 18 and an inner guide member 19 facing each other while being separated by a predetermined interval in the printer unit 11. Further, as depicted in FIGS. 2 and 3, a part of the conveyance path 65, which is positioned between the conveyance roller unit 54 and the discharge roller unit 55 in the front-rear direction 8, is substantially in the center of the multifunction peripheral 10 in the left-right direction 9 to extend in the front-rear direction 8. The conveyance direction 16 of the sheet 12 in the conveyance path 65 is depicted by arrows indicated by dashed-dotted lines in FIG. 2.

<Conveyance Roller Unit 54>

As depicted in FIG. 2, the conveyance roller unit 54 is disposed on the upstream side of the recording unit 24 in the conveyance direction 16. The conveyance roller unit 54 includes the conveyance roller 60 and a pinch roller 61 facing each other. The conveyance roller 60 is driven by the conveyance motor. The pinch roller 61 rotates accompanying with the rotation of the conveyance roller 60. The sheet 12 is conveyed in the conveyance direction 16 while being held or nipped by the conveyance roller 60 and the pinch roller 61 which rotate in the forward direction due to the forward rotation of the conveyance motor.

<Discharge Roller Unit 55>

As depicted in FIG. 2, the discharge roller unit 55 is disposed on the downstream side of the recording unit 24 in the conveyance direction 16. The discharge roller unit 55 includes the discharge roller 62 and a spur roller 63 facing each other. The discharge roller 62 is driven by the conveyance motor. The spur roller 63 rotates accompanying with the rotation of the discharge roller 62. The sheet 12 is conveyed in the conveyance direction 16 while being held or nipped by the discharge roller 62 and the spur roller 63 which rotate in the forward direction due to the forward rotation of the conveyance motor.

<Recording Unit 24>

As depicted in FIG. 2, the recording unit 24 is disposed between the conveyance roller unit 54 and the discharge roller unit 55 in the conveyance direction 16. Further, the recording unit 24 is disposed to face the platen 42 in the up-down direction 7 with the conveyance path 65 intervening therebetween. That is, the recording unit 24 is disposed above the conveyance path 65 in the up-down direction 7 to face the conveyance path 65. The recording unit 24 includes a carriage 23 and a recording head 39.

As depicted in FIG. 3, the carriage 23 is supported by guide rails 43, 44 which extend in the left-right direction 9 in a state of being separated in the front-rear direction 8. The guide rails 43, 44 are supported by the frame of the printer unit 11. The carriage 23 is connected to a known belt mechanism provided for the guide rail 44. The belt mechanism is driven by a carriage motor (not depicted). That is, the carriage 23 connected to the belt mechanism reciprocates in the left-right direction 9 by the drive of the carriage motor. The carriage 23 moves leftward and rightward beyond the conveyance path 65 in the left-right direction 9 as depicted by dashed-dotted lines in FIG. 3.

Ink tubes 32 and a flexible flat cable 33 lead from the carriage 23. The ink tubes 32 connect the ink tank 100 and the recording head 39, and the flexible flat cable 33 electrically connects a control board mounting a controller (not depicted) and the recording head 39. The inks stored in the ink tank 100 are supplied to the recording head 39 through the ink tubes 32. More specifically, four ink tubes 32B, 32M, 32C, and 32Y, through which black, magenta, cyan, and yellow inks pass respectively, lead from the ink tank 100 and are connected to the carriage 23 in a state of being mutually bound. The four ink tubes 32B, 32M, 32C, and 32Y will be described collectively as "ink tubes 32" in some cases. A control signal to be outputted from the controller is transmitted to the recording head 39 via the flexible flat cable 33.

As depicted in FIG. 2, the recording head 39 is carried on the carriage 23. Nozzles 40 are formed on the lower surface of the recording head 39. The tip portions of the nozzles 40 are exposed from the lower surfaces of the recording head 39 and the carriage 23 carrying the recording head 39. In the following, the surface from which the tip portions of the nozzles 40 are exposed will be described as "nozzle surface" in some cases. The recording head 39 discharges the ink(s) from the nozzles 40 as minute ink droplets. The recording head 39 discharges the ink droplets onto a sheet 12 supported by the platen 42 during the movement of the carriage 23. Accordingly, an image is recorded on the sheet 12.

<Platen 42>

As depicted in FIGS. 2 and 3, the platen 42 is disposed between the conveyance roller unit 54 and the discharge roller unit 55 in the conveyance direction 16. The platen 42 is disposed to face the recording unit 24 in the up-down direction 7 so as to support the sheet 12 conveyed by the conveyance roller unit 54 from the lower side of the sheet 12.

<Ink Tank 100>

As depicted in FIGS. 1A and 1B, the ink tank 100 is accommodated in the housing 14. The ink tank 100 is fixed to the multifunction peripheral 10 so as not to be removed from the multifunction peripheral 10 easily.

The front surface of the ink tank 100 is exposed to the outside of the multifunction peripheral 10 via the opening 22, which is formed in the front wall 14A of the housing 14. The opening 22 is adjacent to the opening 13 in the left-right direction 9. The housing 14 is provided with a cover 70 which is swingable between a closed position (see FIG. 1A) where the opening 22 is covered therewith and an open position (see FIG. 1B) where the opening 22 is exposed. The cover 70 is supported by the housing 14 to be swingable around a swing axis 70A as the center of swing. The swing axis 70A extends in the left-right direction 9 on the side of the lower end of the cover 70 in the up-down direction 7. The swing axis 70A is positioned to be closer to a lower end 72 than to an upper end 71 of the cover 70 (see FIG. 12), in a state that the cover 70 covers the opening 22 (the state depicted in FIG. 1A).

Figure 4:
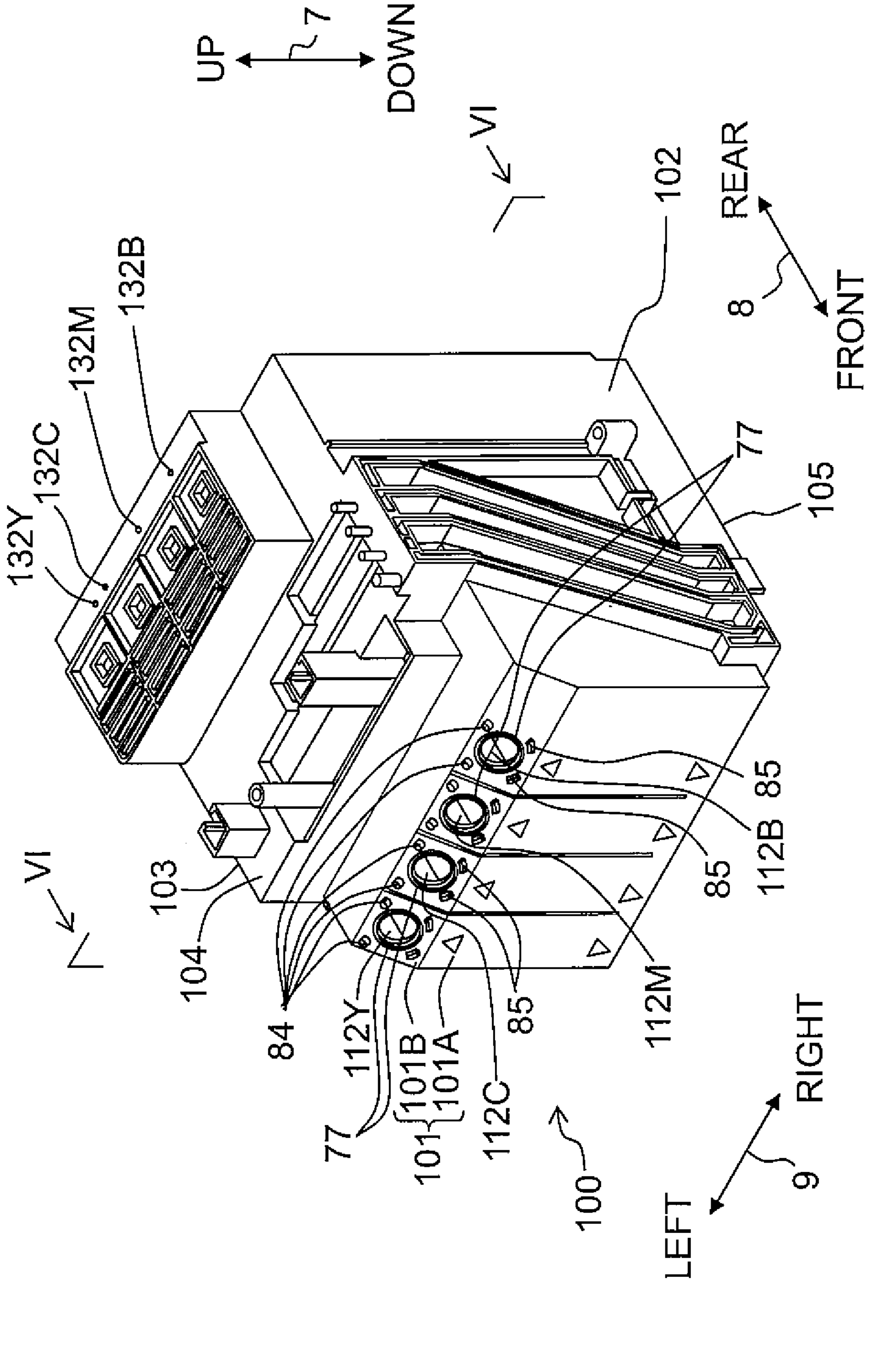
FIG. 4 is a perspective view of the ink tank as viewed from the front side.
Figure 5:
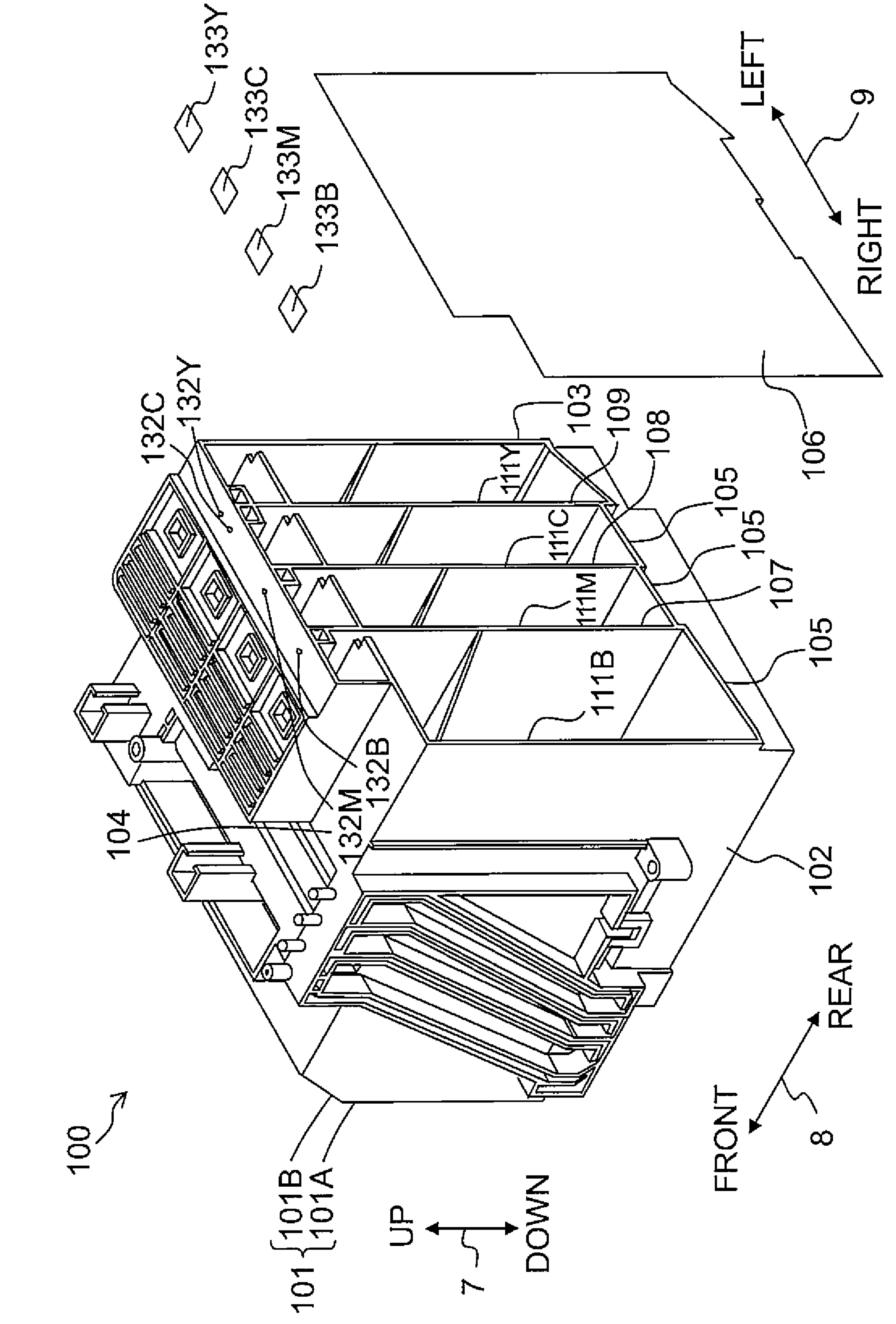
FIG. 5 is a perspective view of the ink tank as viewed from the rear side.

As depicted in FIGS. 4 and 5, the ink tank 100 has a substantially rectangular parallelepiped shape. The ink tank 100 includes a front wall 101, a right wall 102, a left wall 103, an upper wall 104, and a lower wall 105. The respective walls 101 to 105 have translucency to the extent that the inks in ink chambers 111 which will be described later can be visually observed from the outside of the ink tank 100. The front wall 101 is formed of an upstanding wall 101A and an inclined wall 101B. The upstanding wall 101A extends from the lower wall 105 substantially in the up-down direction 7, and the inclined wall 101B slopes in the up-down direction 7 and the front-rear direction 8 so as to be connected to the upper end of the upstanding wall 101A. The upper surface of the lower wall 105 constituting the bottom surfaces of ink chambers 111 slopes downward and rightward. The rear surface of the ink tank 100 is open. The rear surface of the ink tank 100 is sealed by welding a film 106 to the rear end surfaces of the right wall 102, the left wall 103, the upper wall 104, and the lower wall 105. That is, the film 106 constitutes the rear wall of the ink tank 100.

<Ink Chambers 111>

As depicted in FIG. 5, partition walls 107, 108, and 109 are provided in the ink tank 100 to divide the interior space of the ink tank 100. Each of the partition walls 107, 108, and 109 extends in the up-down direction 7 and the front-rear direction 8 to be connected to the front wall 101, the upper wall 104, the lower wall 105, and the film 106. Further, the partition walls 107, 108, and 109 are provided separately from each other in the left-right direction 9. Accordingly, the interior space of the ink tank 100 is divided into four ink chambers 111B, 111M, 111C, and 111Y which are adjacent to each other in the left-right direction 9. Each of the ink chambers 111 is an exemplary liquid storage chamber in which the ink to be discharged from the nozzles 40 is stored.

The ink chamber 111B is a space defined by the front wall 101, the right wall 102, the upper wall 104, the lower wall 105, the film 106, and the partition wall 107. The ink chamber 111M is a space defined by the front wall 101, the upper wall 104, the lower wall 105, the film 106, and the partition walls 107, 108. The ink chamber 111C is a space defined by the front wall 101, the upper wall 104, the lower wall 105, the film 106, and the partition walls 108, 109. The ink chamber 111Y is a space defined by the front wall 101, the left wall 103, the upper wall 104, the lower wall 105, the film 106, and the partition wall 109.

In the following, the ink chambers 111B, 111M, 111C, and 111Y will be collectively described as "ink chambers 111" in some cases. Further, components or parts, which are provided for the four ink chambers 111 respectively, will be expressed by using reference numerals which have the same numeral and mutually different suffixes of B, M, C, and Y. When the components or parts are described collectively, the suffixes (B, M, C, and Y) will be omitted in some cases.

Inks having mutually different colors are stored in the ink chambers 111, respectively. Specifically, a black ink is stored in the ink chamber 111B, a cyan ink is stored in the ink chamber 111C, a magenta ink is stored in the ink chamber 111M, and a yellow ink is stored in the ink chamber 111Y. Each of the color inks is an exemplary liquid. However, the number of ink chambers 111 and the colors of inks are not limited to the above examples. The ink chambers 111 are arranged in the left-right direction 9. Of the four ink chambers 111B, 111M, 111C, and 111Y, the ink chamber 111B is disposed on the rightmost side, and the ink chamber 111Y is disposed on the leftmost side. The ink chamber 111B has a capacity larger than those of other ink chambers 111M, 111C, and 111Y.

<Inlets 112>

Inlets 112B, 112M, 112C, and 112Y through which inks are poured into respective ink chambers 111 are arranged in a row in the left-right direction 9 on the inclined wall 101B of the ink tank 100. The inlets 112 penetrate the inclined wall 101B in its thickness direction to allow the ink chambers 111 corresponding thereto respectively to communicate with the outside of the ink tank 100. The inner surface of the inclined wall 101B faces the ink chambers 111, and the outer surface of the inclined wall 101B faces the outside of the ink tank 100. Thus, the inlets 112 allow the ink chambers 111 to directly communicate with the outside of the ink tank 100. In other words, there are no bending channels having cross-sectional areas smaller than respective inlets between the inlets 112 and the ink chambers 111.

As depicted in FIG. 1B, the inclined wall 101B and the caps 113 attached to the inlets 112 provided on the inclined wall 101B are exposed to the outside of the multifunction peripheral 10 through the opening 22 when the cover 70 is in the open position. In this embodiment, the posture of the ink tank 100 (the posture for pouring ink) taken when the ink(s) is(are) poured into the ink chamber(s) 111 through the inlet(s) 112 is coincident with the posture of the ink tank 100 taken when the multifunction peripheral 10 is in the usable posture. That is, the ink(s) is(are) poured into the ink chamber(s) 111 through the inlet(s) 112 when the multifunction peripheral 10 takes the usable posture.

The inlets 112 are formed in the inclined wall 101B of the ink tank 100 to face outward of the housing 14 and obliquely upward. In other words, a virtual plane including the inlets 112 is along the inclined wall 101B and is inclined in the up-down direction 7 and the front-rear direction 8. A direction, which is orthogonal to the virtual plane and is directed from the inlets 112 to the outside of the ink tank 100, extends obliquely upward from the virtual plane.

Cap elements for closing the inlets 112B, 112M, 112C, and 112Y are provided for respective inlets 112 of the ink tank 100. Each of the cap elements includes the cap 113 which is attachable/detachable with respect to one of the inlets 112 and a holding member 91 integrally formed with the cap 113. The holding member 91 includes an attachment part 92 to be attached to one of the inlets 112 and an elastic deformation part 93. The first end of the elastic deformation part 93 is connected to the cap 113 and the second end, which is the opposite end of the first end, is connected to the attachment part 92. In this embodiment, the cap element is assembled by forming the cap 113 integrally with the holding member 91. As depicted in FIG. 1A, the caps 113 attached to the inlets 112 are brought in tight contact with the peripheries of the inlets 112 to close the inlets 112. Meanwhile, as depicted in FIG. 1B, the caps 113 detached from the inlets 112 open the inlets 112. The caps 113 are attached/detached with respect to the inlets 112 in a state that the cover 70 is in the open position. Ink(s) can be poured into the ink chamber(s) 111 by removing the cap(s) 113 from the inlet(s) 112.

As depicted in FIG. 4, two bosses 84, two projections 85, and a rim 77 defining the circumference of each inlet 112 on the inclined wall 101B are formed at the periphery of each inlet 112 of the ink tank 100. The bosses 84 are formed on the inclined wall 101B at the right rear side and the left rear side of each inlet 112. The bosses 84 are cylindrical projections protruding from the inclined wall 101B. The projections 85 are formed on the inclined wall 101B at the right front side and the left front side of each inlet 112. The projections 85 are formed to extend around each inlet 112 in the circumferential direction of each inlet 112. The projections 85 provided for each inlet 112 are formed at positions where the projections 85 make contact with the attachment part 92 of the holding member 91 (see FIGS. 9A and 9B). Here, the attachment part 92 is a part of the second end of the holding member 91. That is, the projections project from the inclined wall 101B to be disposed in the vicinity of the second end of the holding member 91. The number of bosses 84 and projections 85 and the formation positions and the shapes of bosses 84 and projections 85 are not limited to the above.

<Ink Flow Channels and Atmosphere Communication Holes>

Ink flow channels (not depicted, exemplary outlets) are connected to the ink chambers 111B, 111M, 111C, and 111Y respectively. The inks stored in the ink chambers 111 flow to the outside of the ink tank 100 through the ink flow channels corresponding thereto respectively. One ends of the ink flow channels are connected to the ink chambers 111 corresponding thereto respectively, and the other ends of the ink flow channels are connected to the ink tubes 32 corresponding thereto respectively. Accordingly, the inks stored in the ink chambers 111 are supplied to the recording head 39 via the ink flow channels and ink tubes 32 corresponding thereto respectively.

As depicted in FIGS. 4 and 5, atmosphere communication holes 132B, 132M, 132C, and 132Y are provided in the ink chambers 111B, 111M, 111C, and 111Y respectively. The atmosphere communication holes 132B, 132M, 132C, and 132Y allow the ink chambers 111 corresponding thereto respectively to communicate with the atmosphere. This keeps the internal pressure of each of the ink chambers 111 at atmospheric pressure, and thereby preventing the excessive supply of the ink due to the increase in internal pressure of each of the ink chambers 111, the backflow of the ink due to the decrease in internal pressure of each of the ink chambers 111, and the like. Semipermeable films 133B, 133M, 133C, and 133Y are affixed to the atmosphere communication holes 132B, 132M, 132C, and 132Y so as to prevent the inks from leaking.

<Partition Walls 135>

Figure 6:
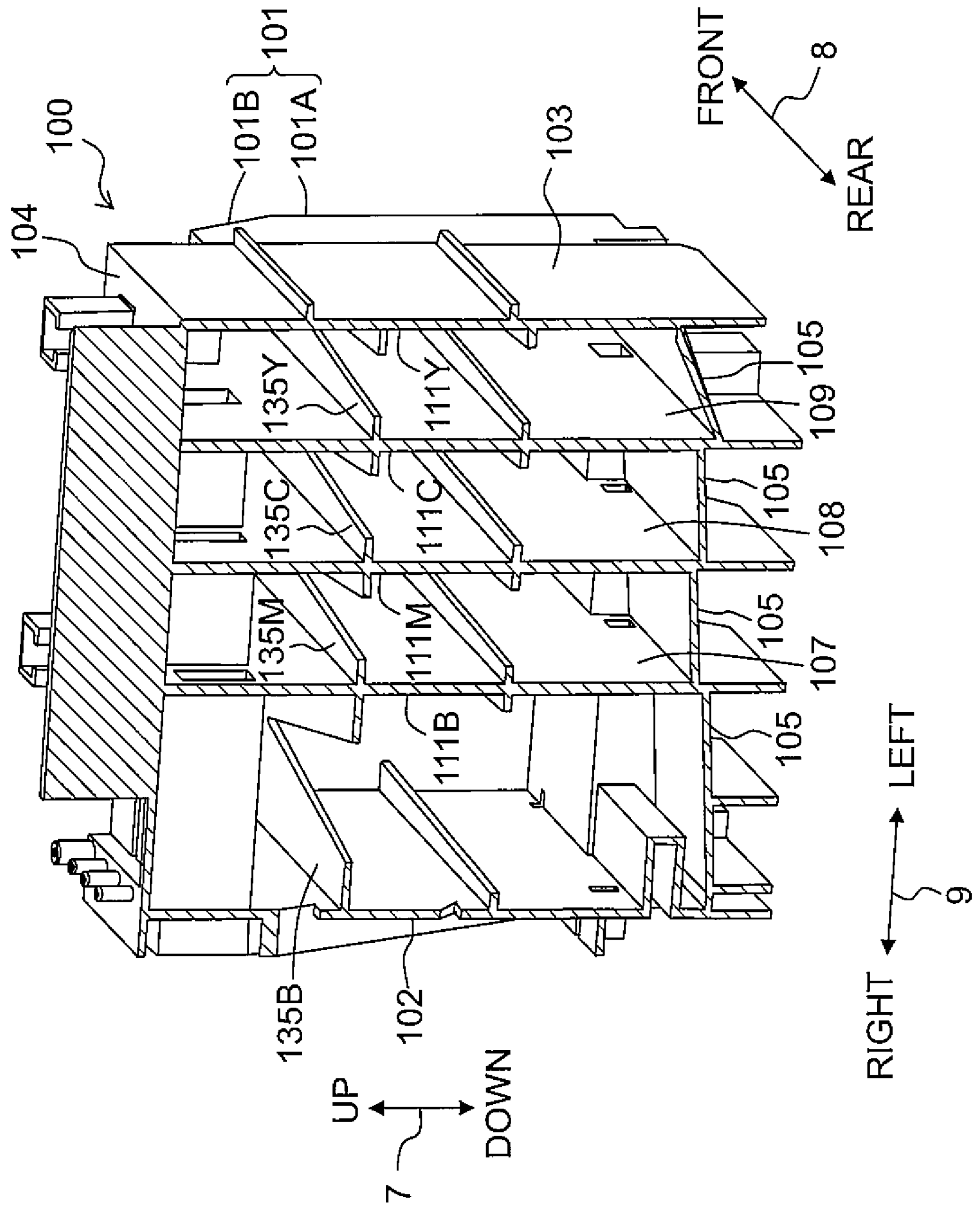
FIG. 6 is a cross-sectional perspective view taken along the line VI-VI in FIG. 4.

As depicted in FIG. 6, partition walls 135B, 135M, 135C, and 135Y extending in the front-rear direction 8 and the left-right direction 9 are provided in the ink chambers 111B, 111M, 111C, and 111Y respectively. In this embodiment, the partition walls 135 extend in a substantially horizontal direction, but the extending direction of the partition walls 135 is not limited to this. For example, the partition walls 135 may incline downward in the up-down direction 7 and rearward in the front-rear direction 8.

The partition wall 135B is connected to the upstanding wall 101A, the right wall 102, the film 106, and the partition wall 107. The partition wall 135M is connected to the upstanding wall 101A, the film 106, and the partition walls 107, 108. The partition wall 135C is connected to the upstanding wall 101A, the film 106, and the partition walls 108, 109. The partition wall 135Y is connected to the upstanding wall 101A, the left wall 103, the film 106, and the partition wall 109. That is, the partition walls 135 are provided below the inlets 112 in the ink chambers 111, respectively. The partition wall 135 partitions a part of the ink chamber 111 in the up-down direction 7. That is, the partition walls 135 are separated from the upper wall 104 and the lower wall 105 so that spaces are provided above and below the partition walls 135 in the up-down direction 7. The partition walls 135B, 135M, 135C, and 135Y have substantially the same shape, and thus an explanation will be made in detail about the partition wall 135M while referring to FIGS. 7 and 8.

Figure 7:
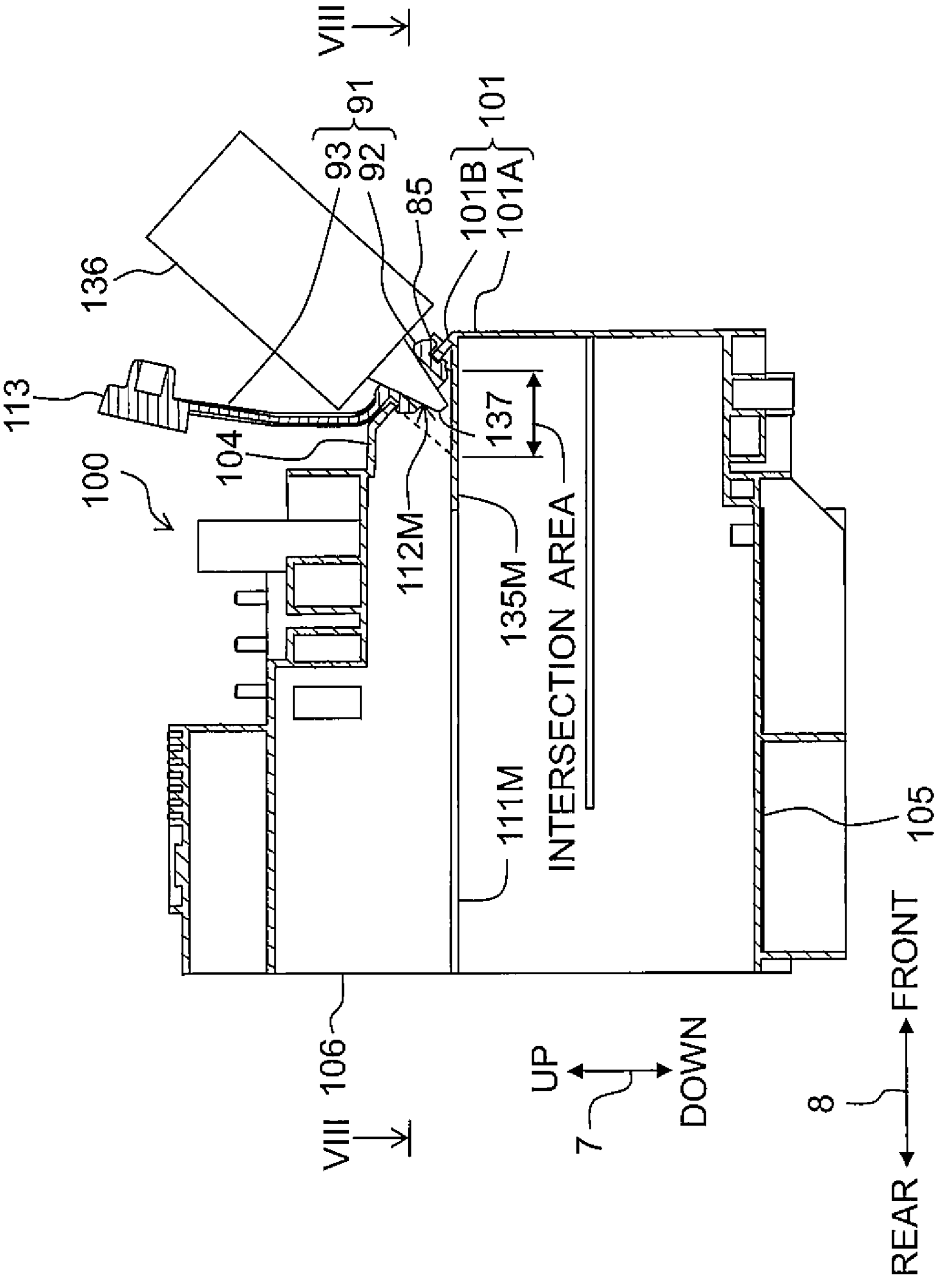
FIG. 7 is a cross-sectional view of the ink tank.

As depicted in FIG. 7, at least a part of the partition wall 135M is in an intersection area. As an example, the intersection area can be defined as an area which intersects with a virtual line (broken lines in FIG. 7) passing the inlet 112M and being orthogonal to the inclined wall 101B. As another example, the intersection area can be defined as an area which intersects with a virtual line passing the inlet 112M and extending in the direction through which the inlet 112M penetrates. As still another example, the intersection area can be defined as an area which intersects with the flow direction of ink flowing from a supply port 137 of an ink bottle 136. The supply port 137 enters the ink chamber 111M through the inlet 112M and the ink bottle 136 is positioned at an ink supply position. That is, the partition wall 135M is in an area where the ink flowing into the ink chamber 111M through the inlet 112M passes. In other words, most of the ink poured into the ink chamber 111M through the inlet 112M hits the partition wall 135M.

Figure 8:
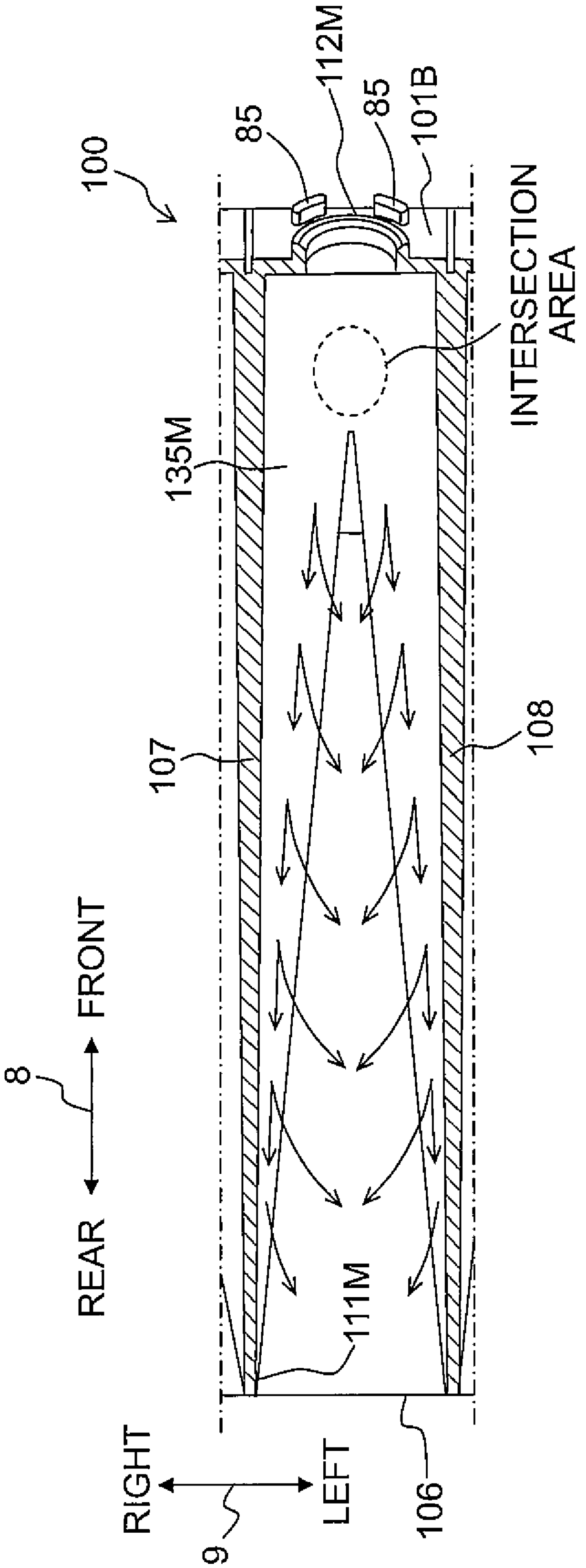
FIG. 8 is a cross-sectional view taken along the line VIII-VIII in FIG. 7.

As depicted in FIG. 8, the partition wall 135M is provided throughout the front side in the front-rear direction 8 of the intersection area. That is, the partition wall 135M is provided throughout the side close to the inlet 112M in the horizontal direction. In other words, the partition wall 135M is continuously formed to be connected to the upstanding wall 101A and the partition walls 107, 108 without any space therebetween on the front side of the intersection area. That is, the partition wall 135M partitions, in the up-down direction 7, the entire area of the ink chamber 111M on the front side of the intersection area. Further, the partition wall 135M extends to the rear side in the front-rear direction 8 of the intersection area (i.e., the side far from the inlet 112M in the horizontal direction). However, a part of the partition wall 135M on the rear side of the intersection area is formed to have an opening. The opening is formed in the partition wall 135M such that an area of the opening (the opening width in the left-right direction 9 in the example of FIG. 8) is larger, as the opening is farther away from the inlet 112M. The shape of the opening is symmetrical in a direction farther away from the inlet 112M along the partition wall 135M (i.e., rearward in the front-rear direction 8). In this embodiment, the shape of the opening is an isosceles triangle, of which top faces frontward.

<Caps 113>

Figure 10:
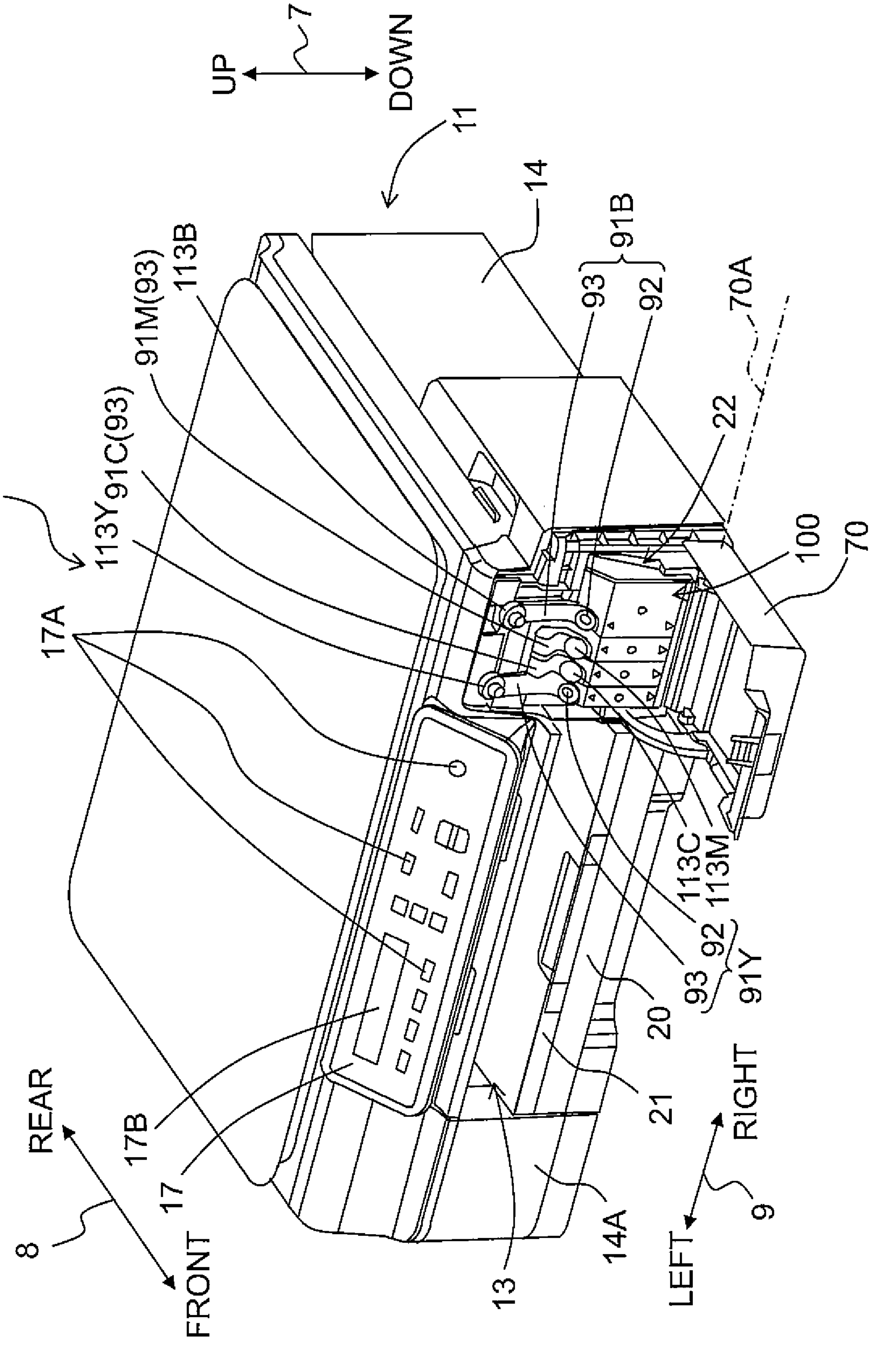
FIG. 10 is a perspective view of the outer appearance of the multifunction peripheral of which cover is open.

As depicted in FIG. 10, the caps 113 are attachable/detachable with respect to the inlets 112 of the ink tank 100. The caps 113 are movable between a first position depicted in FIGS. 12 and 13 and a second position depicted in FIG. 14. The caps 113 are in an attached state at the first position and in a detached state at the second position. In this embodiment, the attached state is a state in which the cap 113 closes the through hole 94 of the attachment part 92 attached to the inlet 112 therewith so as to close the inlet 112 with the cap 113. In the attached state, the inlet 112 of the ink tank 100 does not communicate with the outside. The detached state is a state as follows. That is, the cap 113 is removed from the attachment part 92 attached to the inlet 112 to make the through hole 94 of the attachment part 92 as well as the inlet 112 open. In the detached state, ink can be poured into the ink chamber 111 from the outside of the ink tank 100. Four caps 113B, 113M, 113C, and 113Y are provided corresponding to four inlets 112B, 112M, 112C, and 112Y of the ink tank 100. In FIG. 10, the caps 113M and 113C are in the attached state and the caps 113B and 113Y are in the detached state. The caps 113B, 113M, 113C, and 113Y are colored with colors of inks which are stored in the ink chambers 111 corresponding to the caps 113 respectively. Specifically, the cap 113B is colored with black, the cap 113M is colored with magenta, the cap 113C is colored with cyan, and the cap 113Y is colored with yellow. The caps 113B, 113M, 113C, and 113Y have the same shape. Thus, in the following, one cap among the caps 113B, 113M, 113C, and 113Y will be referred to simply as "cap 113".

Figures 9A, 9B:
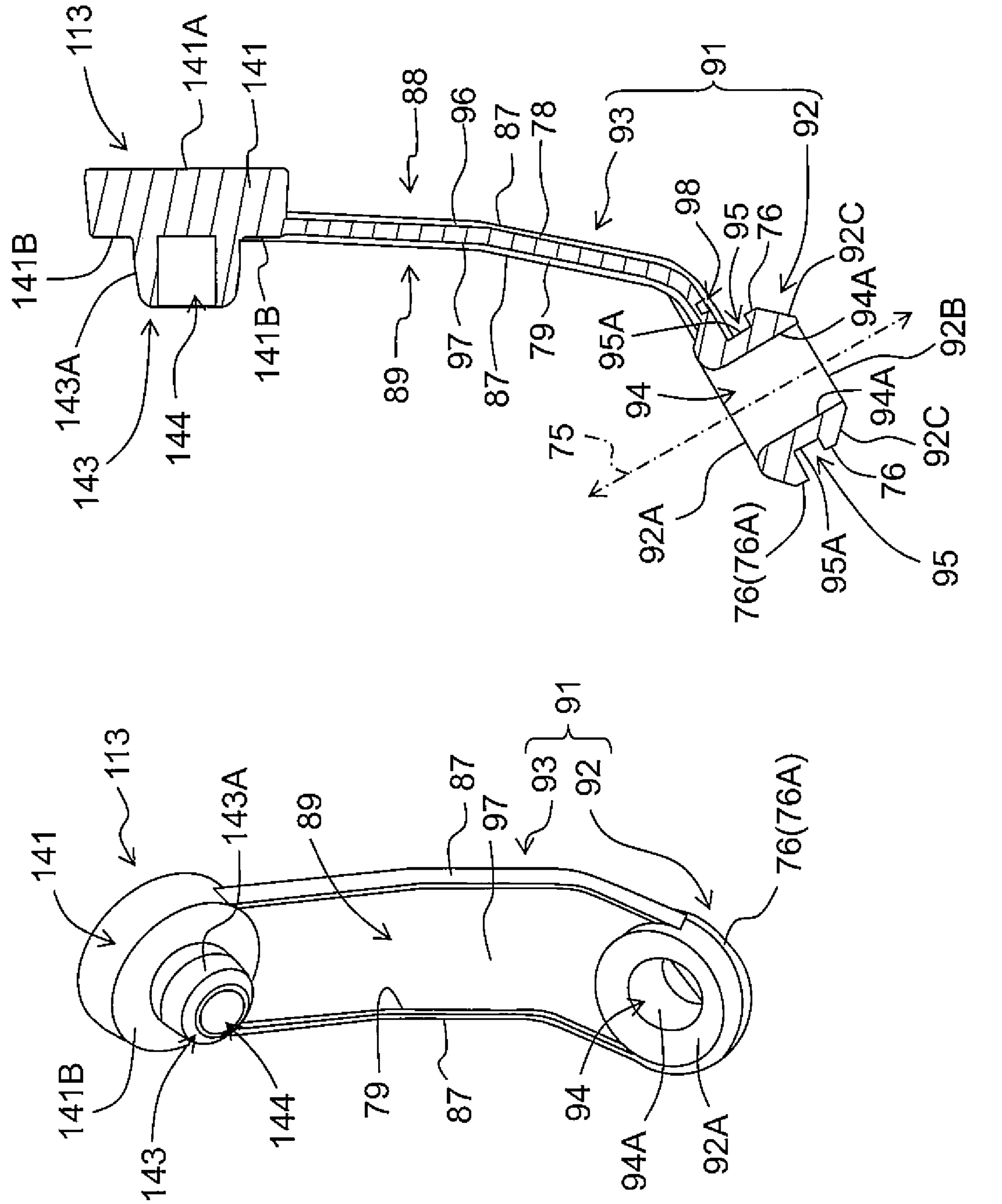
FIG. 9A is a perspective view of the outer appearance of a cap and a holding member.
FIG. 9B is a cross-sectional view of the cap and the holding member.

As depicted in FIGS. 9A and 9B, the cap 113 is formed to have a shape in which a convex part 143 projects from the center of a disk 141 having a substantially disk shape. The cap 113 is made of elastic deformable material such as rubber and elastomer.

The convex part 143 has a substantially cylindrical shape. The convex part 143 projects from the center of the back surface 141B of the disk 141 in the direction orthogonal to the back surface 141B. As will be described later, the inlet 112 is sealed so that no liquid leaks therefrom by inserting the convex part 143 into the through hole 94 formed in the attachment part 92 of the holding member 91. A concave part 144, which is recessed toward the back surface 141B, is formed at the center of the front end of the convex part 143. The concave part 144 allows the outer surface 143A of the convex part 143 to easily fall toward the inside of the convex part 143 in a radial direction. This makes it easy to insert the convex part 143 into the inlet 112.

<Cover 70>

Figure 12:
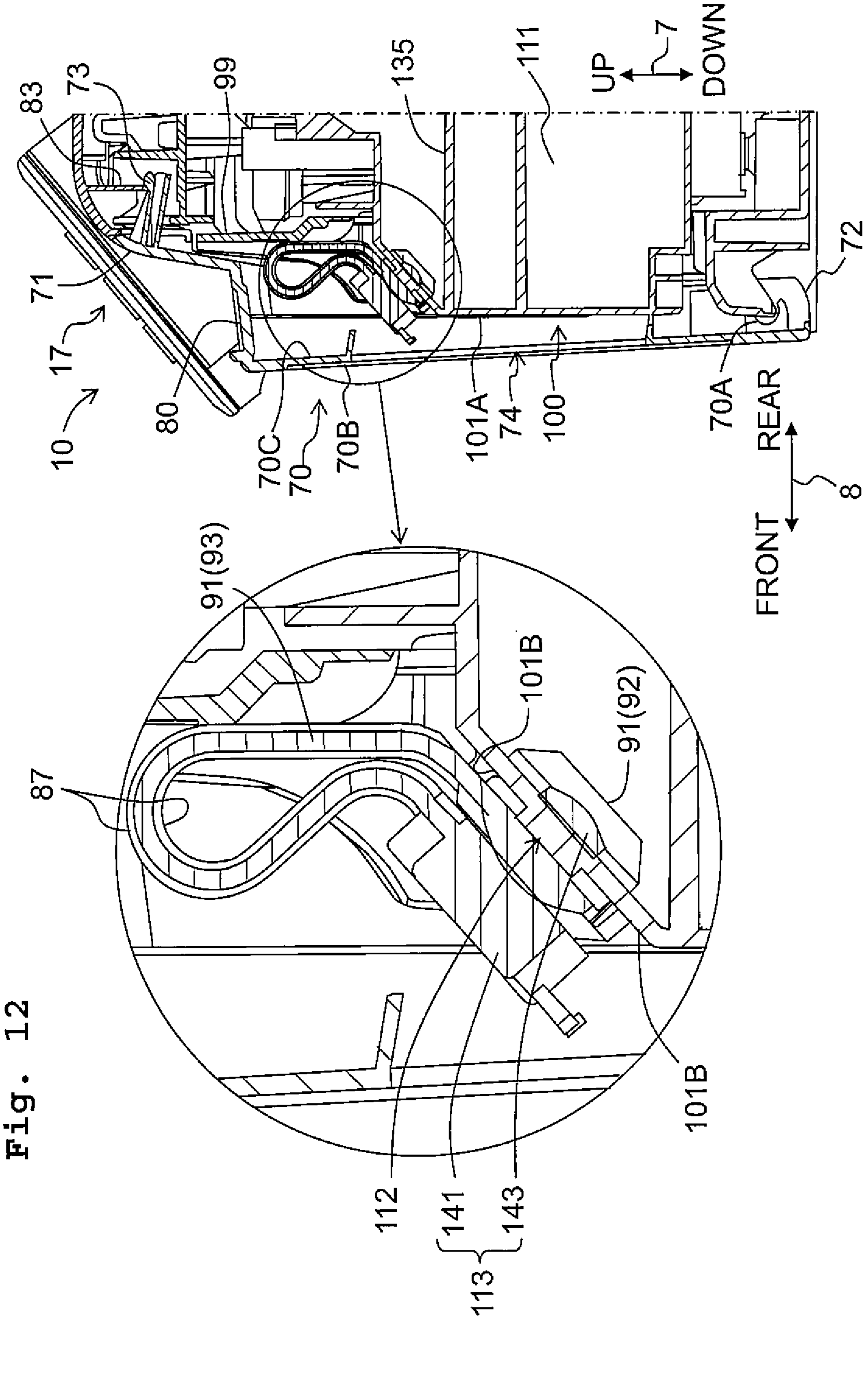
FIG. 12 is an enlarged cross sectional view of the multifunction peripheral in which the cap is attached to an inlet of the ink tank with the cover closed.
Figure 13:
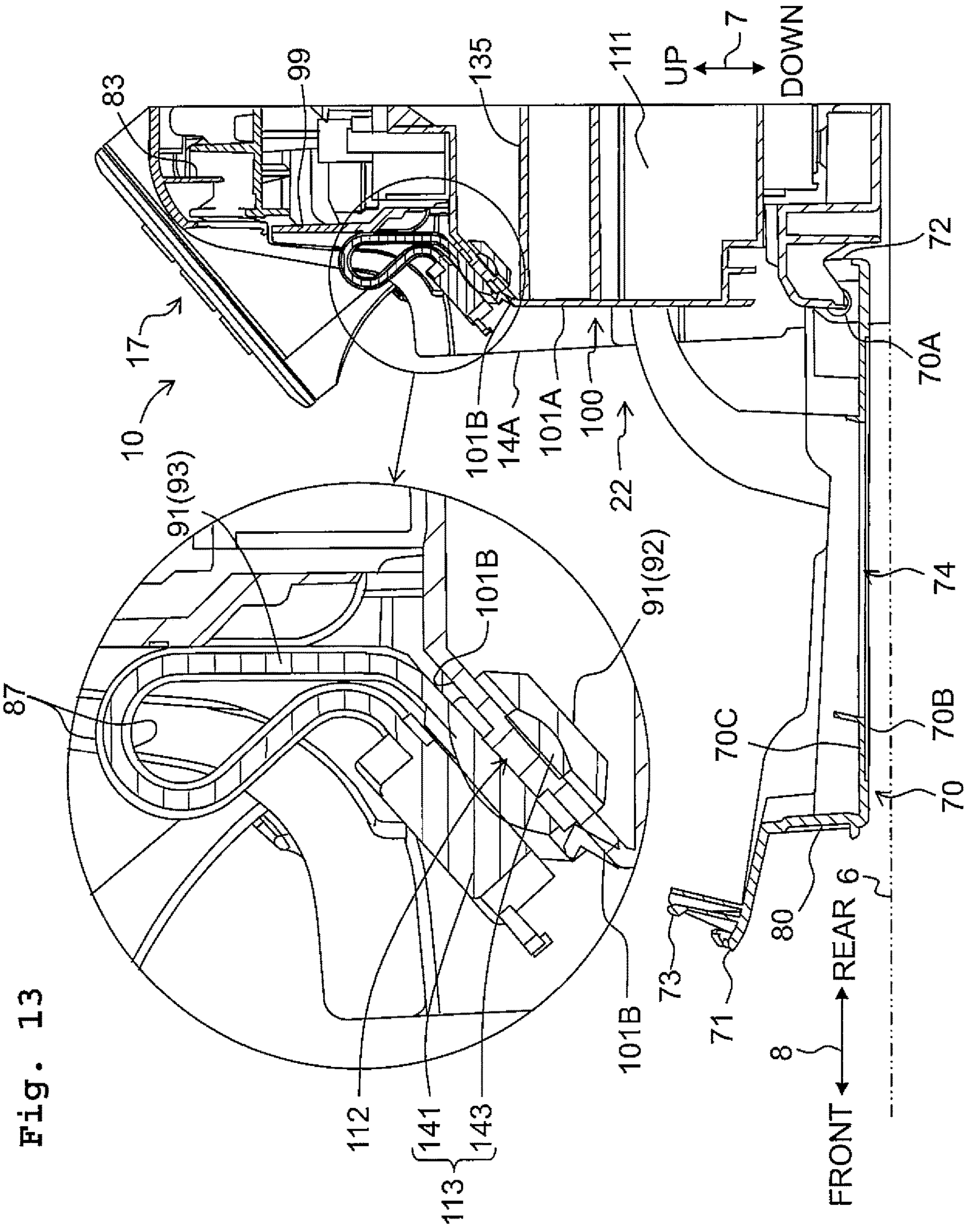
FIG. 13 is an enlarged cross sectional view of the multifunction peripheral in which the cap is attached to an inlet of the ink tank with the cover open.
Figure 14:
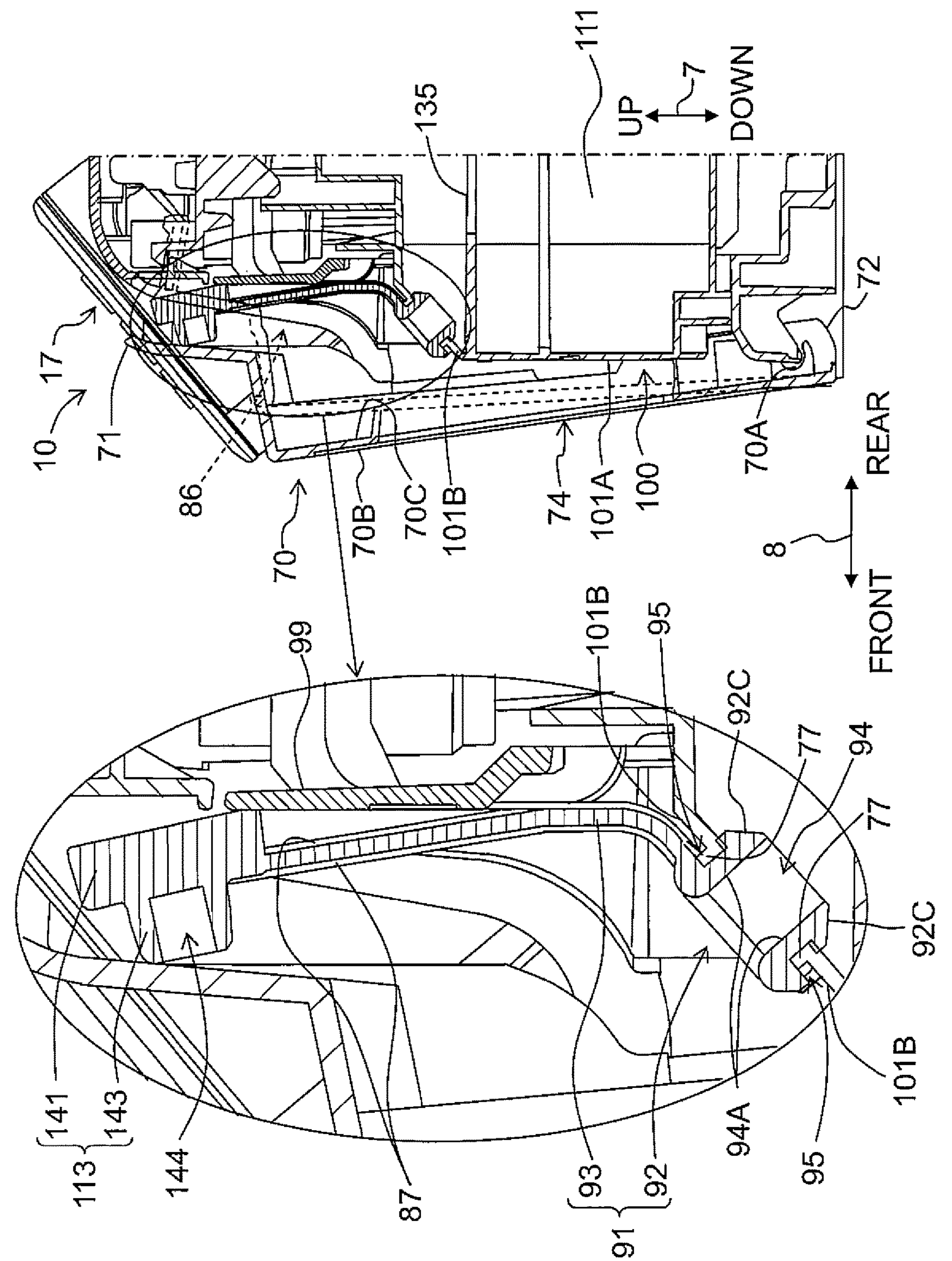
FIG. 14 is an enlarged cross sectional view of the multifunction peripheral in which the holding member holds the cap in the detached state to prevent the cover from moving to the closed position.

As depicted in FIGS. 1A and 1B, the cover 70 is provided to open/close the opening 22 formed in the front wall 14A of the housing 14. The cover 70 swings around the direction extending along the placement surface 6 on which the multifunction peripheral 10 is placed, specifically, around the swing axis 70A extending in the left-right direction 9. The cover 70 has a box shape of which size corresponds to the opening 22, and the cover 70 having the box shape is open at the side of the opening 22. The cover 70 swings between the closed position and the open position around the swing axis 70A as the center of swing. In the closed position, the cover 70 covers the upstanding wall 101A and the inclined wall 101B of the front wall 101 of the ink tank 100 therewith. In the open position, the upstanding wall 101A and the inclined wall 101B of the front wall 101 of the ink tank 100 are exposed to the outside of the housing 14. When the cover 70 is in the closed position, the user can not access the caps 113 from the outside of the multifunction peripheral 10. When the cover 70 is in the open position, the user can access the caps 113 from the outside of the multifunction peripheral 10. In this context, “access” means that the user touches the cap(s) 113 for installing or removing the cap(s) 113 and that the user inserts the ink bottle(s) 136 to the inlet(s) 112 to replenish the ink chamber(s) 111 with the ink(s). As depicted in FIGS. 12 to 14, the cover 70 in the closed position includes an outer surface 70B forming a part of the front wall 14A of the housing 14 and an inner surface facing the ink tank 100. An engagement part 73 (see FIGS. 12 and 13) projecting from the inner surface 70C toward the housing 14 is provided on the side of the upper end 71 of the cover 70. As depicted in FIG. 12, the engagement part 73 keeps or holds the cover 70 in the closed position by being engaged with an engaging-target part 83 formed in the vicinity of the upper end of the opening 22 of the housing 14. The cover 70 includes a first part, a second part, and a third part. The first part is a part in which the engaging part 73 is formed. The second part has a finger grip part 80, which protrudes frontward from the first part with the cover 70 in the closed position and is to be used when the user opens the cover 70. The third part extends downward from the second part with the cover 70 in the closed position. A space is formed, between the third part and the ink tank 100, in which the caps 113 and the holding members 91 can be accommodated in a state that the cover 70 is closed. The upper part of the space, however, is narrow, and thus the holding members 91 can not be accommodated in the upper part of the space with the cover 70 in the closed position.

A window 74 is formed in the center of the cover 70 in the closed position in the up-down direction 7 and the left-right direction 9. The window 74 allows light to pass between the outer surface 70B and the inner surface 70C of the cover 70. The window 74 is formed, for example, by placing or embedding, in the opening, a transparent material which makes visible light pass. The window 74 has a size such that the upper part of the lower end of the upstanding wall 101A and the lower part of the upper end of the inclined wall 101B of the front wall 101 of the ink tank 100 in the up-down direction 7 can be visually confirmed from the side of the front wall 14A of the housing 14 and that the front wall 101 except for the left and right ends in the left-right direction 9 can be visually confirmed.

The window 74 may be formed only of the opening, but in such a case, it is preferred that the window 74 have a size as follows. That is, when the cover 70 is in the closed position, no user can access the cap 113 closing the inlet 112 of the ink tank 100 via the window 74. For example, the window 74 preferably has a size such that the upper part of the lower end of the upstanding wall 101A and the lower part of the upper end of the upstanding wall 101A of the front wall 101 of the ink tank 100 in the up-down direction 7 can be visually confirmed from the side of the front wall 14A of the housing 14.

<Holding Member 91>

As depicted in FIGS. 9A and 9B, the holding member 91 is connected to the cap 113 by being formed integrally with the cap 113. The holding member 91 is made of elastic deformable material such as rubber and elastomer. The holding member 91 may not be formed integrally with the cap 113. For example, the holding member 91 may be connected to the cap 113 by the aid of adhesion using adhesive, engagement, or the like.

Four holding members 91B, 91M, 91C, and 91Y are provided corresponding to four inlets 112B, 112M, 112C, and 112Y of the ink tank 100 and four caps 113B, 113M, 113C, and 113Y, respectively. The holding members 91B, 91M, 91C, and 91Y have the same shape, and thus one holding member among the holding members 91B, 91M, 91C, and 91Y will be referred to simply as “holding member 91” in the following description.

The holding member 91 includes the attachment part 92 and the elastic deformation part 93. The attachment part 92 has a substantially disk shape and is connected to the periphery of the inlet 112. One end of the elastic deformation part 93 is connected to the cap 113 and the other end is connected to the attachment part 92. That is, the holding member 91 has the first end (one end of the elastic deformation part 93) to be connected to the cap 113 and the second end (a portion and the vicinity thereof to which the attachment part 92 is provided), which is the opposite end of the first end, to be connected to the periphery of the attachment part 92.

<Attachment Part 92>

As depicted in FIGS. 9A and 9B, the attachment part 92 is substantially cylindrical. The attachment part 92 has the through hole 94 formed to extend in an axis direction 75 of the cylindrical shape. In other words, the second end of the holding member 91 has the through hole 94. Further, the attachment part 92 has a groove 95 formed along a circumferential surface 76 of the cylindrical attachment part 92.

The diameter of the circle defined by a bottom surface 95A of the groove 95 is slightly bigger than the inner diameter of the inlet 112. The width of the groove 95 is substantially same as the thickness of the rim 77 (see FIG. 14) defining the circumference of the inlet 112 on the inclined wall 101B. An inclined surface 92C is formed on the side of a back surface 92B of the attachment part 92. When the back surface 92B of the attachment part 92 is pushed into the inlet 112, the attachment part 92 formed as described above is inserted into the inlet 112 while being elastically deformed to make the outer diameter of the attachment part 92 small. This allows the rim 77 to be fitted into the groove 95 of the attachment part 92 as depicted in FIG. 14. Accordingly, the attachment part 92 is connected to the periphery of the inlet 112.

The rim 77 is brought into tight contact with the groove 95 in a state that the rim 77 is fitted into the groove 95. This seals the inlet 112 so that no liquid leaks therefrom except for a part at which the through hole 94 of the attachment part 92 is formed. That is, members such as the ink bottle 136 and the cap 113 can access the inlet 112 through the through hole 94 in a state that the attachment part 92 is connected to the periphery of the inlet 112.

As depicted in FIGS. 12 to 14, the attachment part 92 is connected to the periphery of the inlet 112 so that the part to which the elastic deformation part 93 is connected is positioned on the rear side. In other words, the attachment part 92 is connected to the periphery of the inlet 112 so that the part to which the elastic deformation part 93 is connected is disposed at the highest position in the up-down direction 7.

As will be explained below in detail, the inlet 112 is completely sealed so that no liquid leaks therefrom by inserting or fitting the convex part 143 of the cap 113 into the through hole 94 of the attachment part 92. The inner diameter of the through hole 94 is slightly smaller than the outer diameter of the convex part 143 of the cap 113. Thus, the convex part 143 is inserted into the inlet 112 while being elastically deformed to reduce the outer diameter. The through hole 94 is elastically deformed to increase the inner diameter when the convex part 143 is inserted into the inlet 112. The outer surface 143A of the convex part 143 is brought into tight contact with an inner surface 94A of the through hole 94 in a state that the convex part 143 is inserted into the through hole 94. This completely seals the inlet 112 so that no liquid leaks therefrom. In this situation, the cap 113 is in the attached state.

A part 76A, of the circumferential surface 76 of the cylindrical attachment part 92, which is positioned on the side closer to a surface 92A than to the groove 95 and on the front side of the through hole 94, makes contact with the projections 85 in a state that the attachment part 92 is connected to the periphery of the inlet 112. This prevents that a fingernail of the user catches or scratches the attachment part 92 from the front side. Thus, the attachment part 92 is less likely to be accidentally removed from the inlet 112. The projections 85 may be formed at a position where the projections 85 do not make contact with the circumferential surface 76A, provided that the attachment part 92 is prevented from being touched from the front side.

<Elastic Deformation Part 93>

As depicted in FIGS. 9A and 9B, the elastic deformation part 93 extends from the circumferential surface 76 of the attachment part 92 to have a belt shape. One end of the elastic deformation part 93 in a longitudinal direction is connected to the attachment part 92. The other end of the elastic deformation part 93 in the longitudinal direction is connected to the cap 113.

The flat surface 96, of a pair of flat surfaces 96, 97, is oriented in the same direction as the back surface 92B of the attachment part 92 and a surface 141A of the disk 141 of the cap 113. The flat surfaces 96, 97 face each other in the thickness direction of the elastic deformation part 93. The flat surface 97 of the elastic deformation part 93 is oriented in the same direction as the surface 92A of the attachment part 92 and the back surface 141B of the disk 141 of the cap 113.

A pair of ribs 87 is formed at both ends of the elastic deformation part 93 in a lateral direction. The ribs 87 protrude from the flat surfaces 96, 97 respectively in an orthogonal direction orthogonal to the flat surfaces 96, 97. The ribs 87 extend in the longitudinal direction of the elastic deformation part 93. A concave surface 88 is formed by the flat surface 96 and surfaces 78, of the ribs 87, positioned on the inside in the lateral direction. A concave surface 89 is formed by the flat surface 97 and surfaces 79, of the ribs 87, positioned on the inside in the lateral direction.

Recesses 98 are formed, in the flat surface 96 of the elastic deformation part 93, in the vicinity of the attachment part 92. The recesses 98 are formed as a pair with a space therebetween in the lateral direction of the elastic deformation part 93. Each of the recesses 98 is formed at a position corresponding to one of two bosses 84 (see FIG. 4) formed on the inclined wall 101B of the ink tank 100. The inner diameter and depth of each recess 98 are substantially same as the outer diameter and projection length of each boss 84. Accordingly, the bosses 84 are fitted into the recesses 98 in a state that the attachment part 92 is attached to the inlet 112. That is, the second end of the holding member 91 is engaged with the bosses 84.

As depicted in FIGS. 9A, 9B, and 14, when in a predetermined or normal state in which no force is applied from outside, the elastic deformation part 93 extends substantially straight. In this state, the cap 113 is separated from the inlet 112 and is held in the detached state. That is, the holding member 91 holds the cap 113 in the detached state by an elastic force of the holding member 91 against a self-weight of the cap 113.

When the force is applied to the elastic deformation part 93 in the predetermined or normal state, the elastic deformation part 93 deforms elastically. This curves the elastic deformation part 93 so that the elastic deformation part 93 has an arc shape as depicted in FIGS. 12 and 13. In this situation, the concave surface 88 depicted in FIG. 9B has a shape that the surface on the outside of curve of the curved elastic deformation part 93 is concave toward the inside of curve of the curved elastic deformation part 93. Further, the concave surface 89 depicted in FIG. 9B has a shape that the surface on the inside of curve of the curved elastic deformation part 93 is concave toward the outside of curve of the curved elastic deformation part 93. When force is no longer applied to the elastic deformation part 93, the elastic deformation part 93 is elastically restored to again extend substantially straight.

The elastic deformation part 93 may not include the ribs 87, provided that the elastic deformation part 93 can be elastically restored when force is no longer applied to the elastic deformation part 93. Alternatively, the ribs 87 may protrude from only one of the flat surfaces 96, 97. The concave surfaces 88, 89 may not be formed as bent surfaces, which are formed of the ribs 87 and the flat surfaces 96, 97 respectively, but may be formed as curved surfaces.

<Attachment/Detachment of Cap 113 with Respect to Inlet 112>

When the multifunction peripheral 10 is placed to be usable (usable state), the inlet 112 of the ink tank 100 is sealed with the cap 113 and the holding member 91 as depicted in FIGS. 1A and 12. Specifically, the inlet 112 is sealed so that no liquid leaks therefrom by connecting the attachment part 92 of the holding member 91 to the periphery of the inlet 112 and inserting the cap 113 into the through hole 94 of the attachment part 92 of the holding member 91. In this state, the cap 113 is in the attached state.

When the cap 113 is in the attached state, the elastic deformation member 93 of the holding member 91 is elastically deformed to curve in an arc. In this situation, the resilience acts on the elastic deformation members 93. The resilience is the force which makes the elastic deformation member 93 extend substantially straight (which makes the elastic deformation member 93 the state depicted in FIGS. 9A, 9B, and 14). The resilience, however, is smaller than the force which makes the convex part 143 of the cap 113 contact under pressure with the inner surface 94A of the through hole 94. Thus, the state in which the convex part 143 is inserted into the through hole 94 is maintained. In other words, the cap 113 is held in the attached state. In this state, neither the cap 113 nor the curved elastic deformation member 93 interferes with the cover 70 in the closed position.

When the multifunction peripheral 10 is in the usable state, the opening 22 (see FIG. 1B) of the front wall 14A of the housing 14 is closed with the cover 70 in the closed position. When the multifunction peripheral 10 is in the usable state, the front wall 14A extends in the direction intersecting with the placement surface 6 on which the multifunction peripheral 10 is placed.

When the ink in each of the ink chambers 111 of the ink tank 100 is consumed to have insufficient amount, a user swings the cover 70 from the closed position to the open position as depicted in FIGS. 10 and 13. This makes it possible for the user to access each of the caps 113 of the ink tank 100 through the opening 22 of the front wall 14A of the housing 14.

After swinging the cover 70 to the open position, the user removes, the cap 113 corresponding to the ink chamber 111 to which the ink is to be supplied, from the through hole 94 of the attachment part 92 of the holding member 91. In FIG. 10, the caps 113Y and 113B are removed from the through holes 94.

Removing the cap 113 from the through hole 94 allows the cap 113 to be free from the force, which makes the convex part 143 of the cap 113 contact under pressure with the inner surface 94A of the through hole 94. Then, the elastic deformation part 93 is elastically restored by the resilience to extend substantially straight. In this situation, the cap 113 is in the detached state. Accordingly, the state of the cap 113 changes from the attached state to the detached state, and the holding member 91 holds the cap 113 in the detached state.

As depicted in FIG. 14, the elastic deformation part 93 extending substantially straight extends substantially upward from the attachment part 92 along a frame 99 of the multifunction peripheral 10 which is disposed on the rear side and the upper side of the inclined wall 101B. The holding member 91 holds, above the inlet 112, the cap 113 in the detached state, as depicted in FIGS. 10 and 14. That is, when the cap 113 is in the detached state, the holding member 91 holds the cap 113, which corresponds to each of the inlets 112, on the upper side of the corresponding inlet 112 different from the right or left side of the corresponding inlet 112. In other words, the holding member 91 holds the cap 113, which corresponds to each of the inlets 112, on the upper side of the corresponding inlet 112, instead of holding the cap 113 in the arrangement direction of four inlets 112B, 112M, 112C, and 112Y.

Removing the cap 113 from the through hole 94 enables the user to access the inlet 112 of the ink tank 100. Specifically, after removing the cap 113 from the through hole 94, as depicted in FIG. 7, the user inserts the supply port 137 of the ink bottle 136 into the inlet 112 to replenish the ink chamber 111 with the ink. After replenishing the ink chamber 111 with the ink, the user inserts the cap 113 into the through hole 94 to seal the inlet 112. In this situation, the elastic deformation part 93 of the holding member 91 elastically deforms to curve in an arc. Further, the state of the cap 113 changes from the detached state to the attached state. After that, the user swings the cover 70 from the open position to the closed position.

It is assumed that, after replenishing the ink chamber 111 with the ink, the user attempts to swing the cover 70 from the open position to the closed position in a state that the cap 113 in the detached state is held above the inlet 112 without sealing the inlet 112 therewith.

As depicted in FIG. 14, the convex part 143, which is a part of the cap 113 and is held above the inlet 112, and its surroundings project outward beyond an area 86 occupied by the cover 70 in the closed position. The outline of the cover 70 in the closed position is depicted by broken line in FIG. 14. As depicted in FIG. 14, the area 86 is positioned on the side closer to the ink tank 100 than to the broken line depicted in FIG. 14. More specifically, the space between the housing 14 and the upper part (first part) of the cover 70 is narrower than the space between the ink tank 100 and the part (third part) forming the window 74. Thus, even when the cap 113 in the detached state attempts to enter the space between the housing 14 and the first part of the cover 70 in the closed position, the cap 113 fails to enter the space.

Therefore, as depicted in FIG. 14, before the cover 70 reaches the closed position from the open position, the inner surface 70C of the cover 70 makes contact with the cap 113 in a state of being held above the inlet 112. In other words, the upper end 71, which is the pivot front-end portion of the cover 70 swinging from the open position to the closed position, makes contact with the cap 113 in the detached state. Any part of the cover 70 other than the upper end 71 may make contact with the cap 113 in the detached state.

Figure 11:
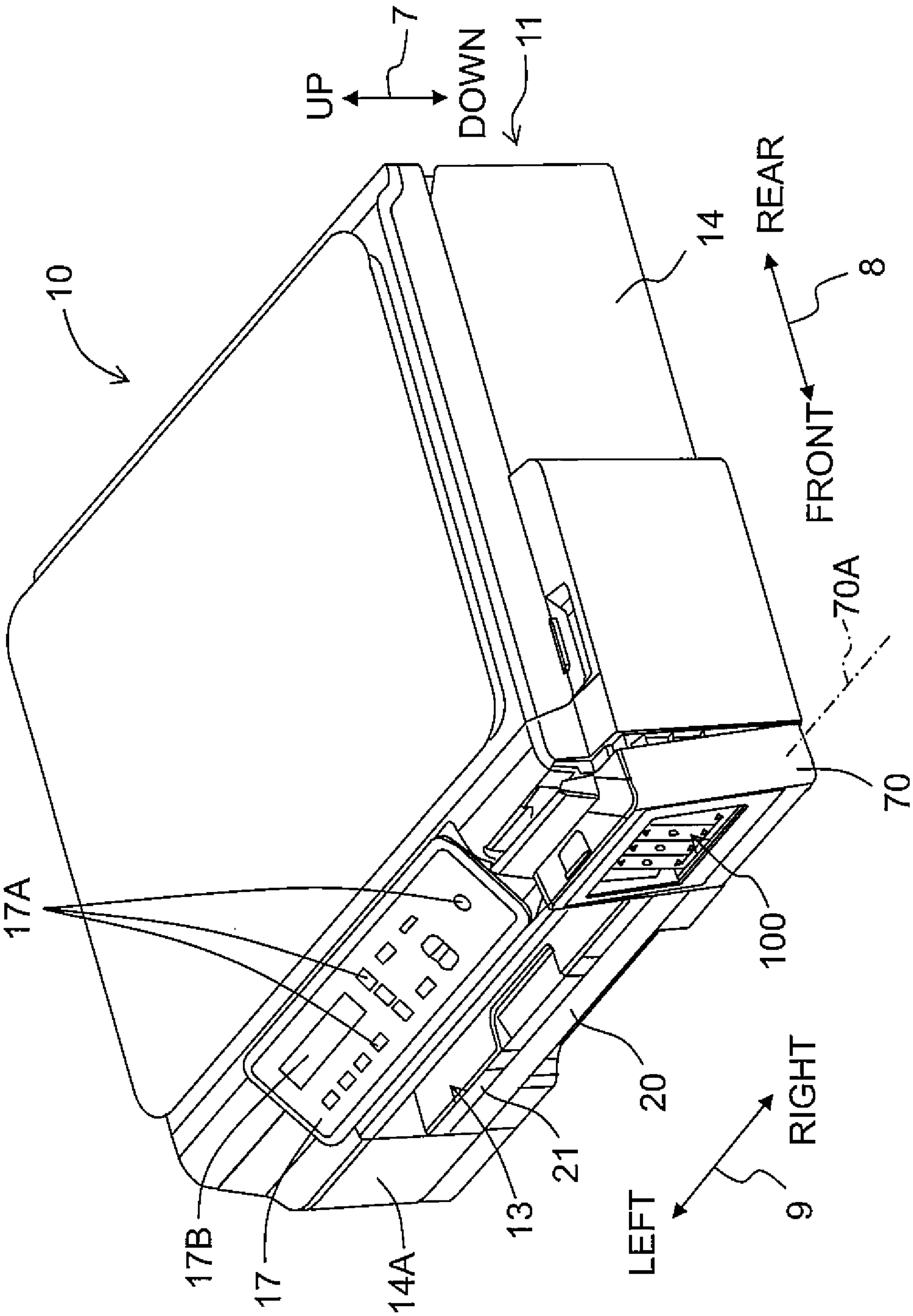
FIG. 11 is a perspective view of the outer appearance of the multifunction peripheral in which the holding member holds the cap in a detached state to prevent the cover from moving to a closed position.

Accordingly, the cap 113 in the state of being held above the inlet 112 stands or intervenes between the upstanding wall 101A of the front wall 101 of the ink tank 100 and the inner surface 70C of the cover 70. This prevents the cover 70 from swinging to the closed position, as depicted in FIGS. 11 and 14.

[Action and Effect]

In this embodiment, a user can access the cap 113 in a state that the cover 70 is in the open position. Removing the cap 113 from the inlet 112 of the ink tank 100 allows the user to replenish the ink tank 100 with the ink. The cap 113 detached from the inlet 112 is held in the detached state by the holding member 91. This can prevent the loss of the cap 113 and the dirt or stain on the placement surface 6 which would be otherwise caused by putting the cap 113 on the placement surface 6. When the cover 70 is moved from the open position to the closed position in a state that the cap 113 is in the detached state, the cap 113 in the detached state or the holding member 91 blocks the movement of the cover 70. This enables the user to know that the cap 113 is not attached to the inlet 112.

If the holding member 91 holds, below the inlet 112, the cap 113 in the detached state, the user could have difficulty in visually observing the ink in the ink tank 100 from the outside of the ink tank 100, because there is fear that the cap 113 and/or the holding member 91 might hinder the user's view. In this embodiment, since the holding member 91 holds, above the inlet 112, the cap 113 in the detached state, neither the cap 113 nor the holding member 91 prevents the user from visually observing the ink in the ink tank 100 from the outside of the ink tank 100.

In this embodiment, at least a part of the cap 113 in the detached state or the holding member 91 projects outward beyond the area occupied by the cover 70 in the closed position. Thus, a user can easily know that the cap 113 in the detached state or the holding member 91 obstructs the movement of the cover 70.

In this embodiment, the ink tank 100 includes the ink chambers 111 and the inlets 112 corresponding thereto respectively, and the caps 113 and the holding members 91 are provided corresponding to the inlets 112, respectively. This reduces the weight of each of the caps 113 and each of the holding members 91, thereby making it easy to open/close the inlets 112 by use of the caps 113.

In this embodiment, each of the holding members 91 holds one of the caps 113 in the detached state so that the cap 113 is positioned in the direction, which is different from the direction in which adjacent inlets 112 are arranged, in other words, in the direction which is different from the arrangement direction of the inlets 112. Thus, a user can pour the ink through a predetermined inlet 112 without being obstructed by the cap(s) 113 and the holding member(s) 91 corresponding to the inlet(s) 112 disposed adjacently to the predetermined inlet 112.

In this embodiment, the holding member 91 is formed to be elastically deformable. Thus, the holding member 91 can hold the cap 113 in the detached state in a simple manner.

In this embodiment, the first end of the holding member 91 is connected to the cap 113, and the second end of the holding member 91 is connected to the periphery of the inlet 112 of the ink tank 100. That is, the second end of the holding member 91 is positioned in the vicinity of the inlet 112. This makes it easy to attach/detach the cap 113 connected to the holding member 91 with respect to the inlet 112.

In this embodiment, the second end of the holding member 91 is engaged with the bosses 84 provided on the periphery of the inlet 112. Thus, the holding member 91 can be prevented from coming off the ink tank 100.

In this embodiment, the ink tank 100 includes the projections 85 which project from the inclined wall 101B to be disposed in the vicinity of the second end of the holding member 91. This configuration or structure can prevent a user from accidentally catching or scratching the holding member 91 with his/her nail and removing the holding member 91 from the ink tank 100, when the user attempts to remove the cap 113 from the inlet 112 by catching or scratching the cap 113 with his/her nail from the projection 85 side.

In this embodiment, the elastic deformation part 93 of the holding member 91 has the concave surfaces. Thus, the holding member 91 is more likely to be elastically restored to hold the cap 113 in the detached state.

In this embodiment, the caps 113 are colored with the colors of inks which are stored in the ink chambers 111 corresponding to the caps 113 respectively. Thus, a user can easily know the colors of inks stored in the ink chambers 111 from the outside of the ink tank 100.

[Modified Embodiments]

In the above embodiment, a part of the cap 113 in the detached state protrudes outward beyond the area 86. The cap 113 in the detached state, however, may entirely protrude outward beyond the area 86. Or, when the cap 113 is in the detached state, at least a part of the holding member 91 may project outward beyond the area 86. In this case, the holding member 91 obstructs the movement of the cover 70 from the open position to the closed position. Further, in this case, the cover 70 swinging from the open position to the closed position may make contact with the holding member 91.

The cover 70 may move between the closed position and the open position in any other manner than the swing. Further, the holding member 91 may hold the cap 113 in the detached state at any other position than the upper side of the inlet 112.

For example, instead of providing the cover 70 swinging around the swing axis 70A, the ink tank 100 may be configured to be movable in the front-rear direction 8 so that the ink tank 100 is pulled or drawn out of (FIG. 15C) and accommodated in (FIG. 15B) the housing 14 through the opening 22 of the housing 14, as depicted in FIGS. 15A to 15D. In such a configuration, the inlets 112, the caps 113, and the holding members 91 are provided at the right end of the upper wall 104 of the ink tank 100. The inlets 112, the caps 113, and the holding members 91 may be provided at the left end of the upper wall 104 of the ink tank 100.

That is, in this modified embodiment, a part of the housing 14 facing the upper wall 104 of the ink tank 100 functions as a cover. When the ink tank 100 is accommodated in the housing 14, the part of the housing 14 functioning as the cover is in a closed position where the upper wall 104 having the inlets 112 formed therein is covered with the part of the housing 14. When the ink tank 100 is pulled or drawn out, the part of the housing 14 functioning as the cover is in an open position where the upper wall 104 having the inlets 112 formed therein is exposed. When the ink tank 100 moves from the pulled-out state to the accommodated state, the part of the housing 14 functioning as the cover moves from the open position to the closed position. That is, the movement of the cover with respect to the ink tank 100 includes a relative movement between the cover and the ink tank 100.

Figure 15A:
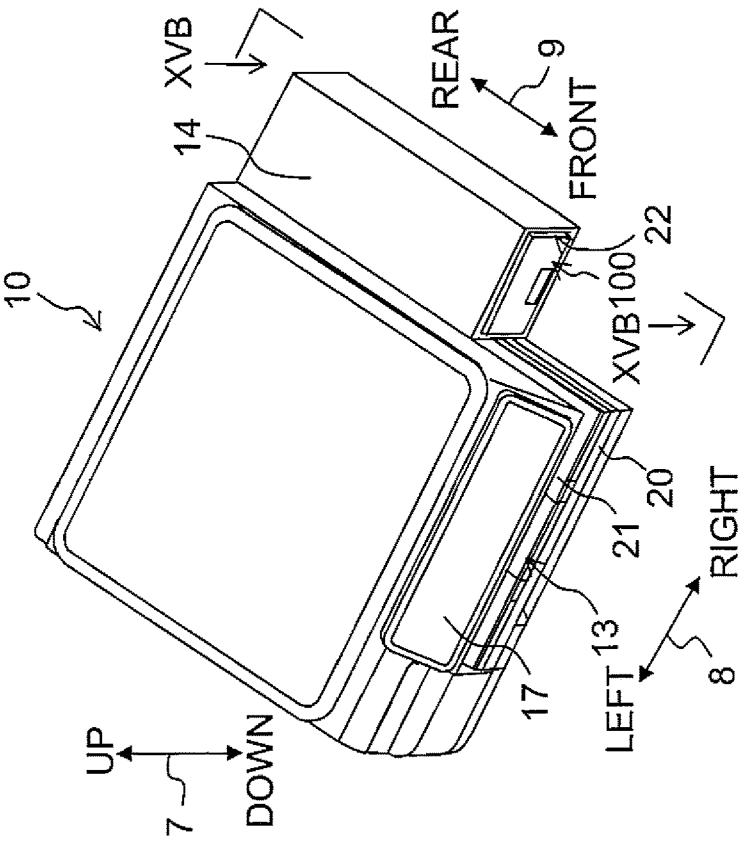
FIG. 15A is a perspective view of the outer appearance of a modified multifunction peripheral.
Figure 15B:
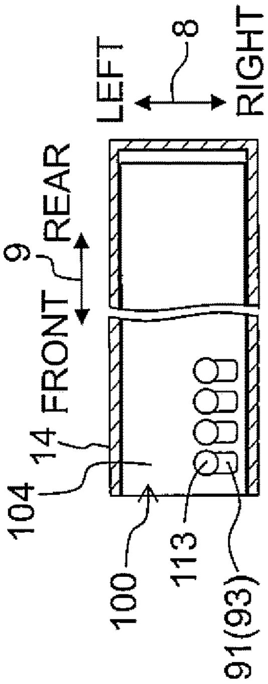
FIG. 15B is a cross-sectional view taken along the line XVB-XVB in FIG. 15A and depicting a housing in which the ink tank is accommodated.
Figure 15C:
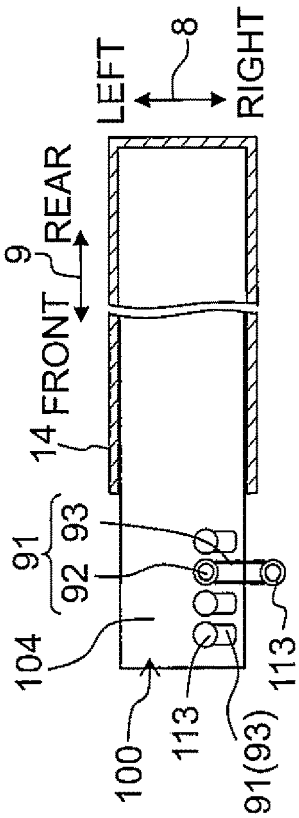
FIG. 15C is a cross-sectional view taken along the line XVB-XVB in FIG. 15A and depicting the housing in which the ink tank is pulled out and one of the caps is in the detached state.

As depicted in FIG. 15C, the cap 113 can be attachable/detachable with respect to the inlet 112 in the state that the ink tank 100 is pulled or drawn out of the housing 14 through the opening 22, that is, in the state that the part of the housing 14 functioning as the cover is in the open position. The holding member 91 holds, on the right side which is a position other than the upper side of the inlet 112, the cap 113 in the detached state. Specifically, the holding member 91 holds, on the right side of the housing 14, the cap 113 in the detached state.

Figure 15D:
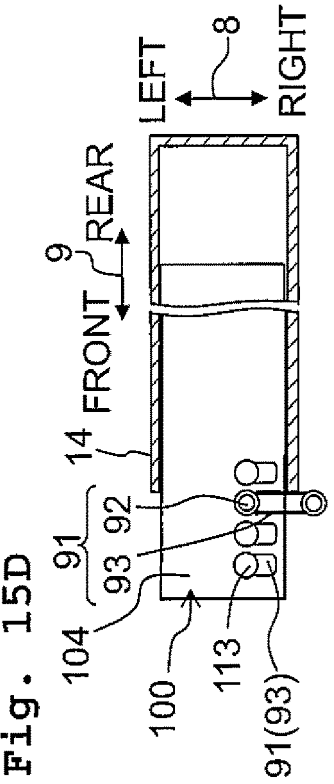
FIG. 15D is a cross-sectional view taken along the line XVB-XVB in FIG. 15A and depicting the housing in which the holding member holds one of the caps in the detached state to prevent the cover from moving to the closed position.

As depicted in FIG. 15D, when the ink tank 100 moves from the pulled-out state to the accommodated state in a state that the cap 113 is removed from the inlet 112, the holding member 91 makes contact with the periphery of the opening 22 of the housing 14. This prevents the ink tank 100 from moving to the accommodated state. That is, the part of the housing 14 functioning as the cover is prevented from moving to the closed position. The cap 113 may make contact with the periphery of the opening 22 of the housing 14 when the ink tank 100 moves from the pulled-out state to the accommodated state.

The shape of the holding member 91 may be changed appropriately. For example, unlike the above embodiment, the holding member 91 may be formed only of the elastic deformation part 93 without being provided with the attachment part 92. In this case, the holding member 91 is fixed to the ink tank 100 only by engaging the bosses 84 of the ink tank 100 with the recesses 98 of the elastic deformation part 93. Further, in this case, the cap 113 is inserted into the inlet 112 instead of being inserted into the through hole 94 of the attachment part 92. The inlet 112 is sealed only with the cap 113 so that no liquid leaks therefrom.

For example, the holding member 91 may have a biasing member such as a spring, instead of the elastic deformation part 93, which is connected to the cap 113 and the attachment part 92 and which biases the cap 113 so that the cap 113 reaches the detached state. The holding member 91 may have a hinge, instead of the elastic deformation part 93, which is connected to the cap 113 and the attachment part 92 and which supports the cap 113 so that the cap 113 is swingable between the attached state and the detached state.

The shape of the cap 113 may be changed appropriately. For example, as described above, the cap 113 may have a shape to be inserted into the inlet 112 instead of being inserted into the through hole 94 of the attachment part 92.

Or, the cap 113 may be configured to seal the inlet 112 such that a male screw formed around the inlet 112 is screwed into a female screw formed in the cap 113.

In the above embodiment, the opening 22 is formed on the right side of the front wall 14A of the housing 14 and the ink tank 100 is disposed on the rear side of the opening 22. The opening 22, however, may be formed on the left side of the front wall 14A and the ink tank 100 may be disposed on the rear side of the opening 22. Or, instead of providing the opening 22 in the front wall 14A of the housing 14, the opening 22 may be formed in the right lateral wall or the left lateral wall so that a user can access the inlets 112 of the ink tank 100 from the right side or the left side.

The above embodiment(s) of the present teaching has been explained by citing the ink as an example of liquid. The present teaching, however, is not limited to this. For example, instead of the ink, it is allowable to use, as the liquid, a pretreatment liquid to be discharged on a recording sheet before the discharge of ink at the time of printing, water to be sprayed in the vicinity of the nozzles 40 of the recording head 39 so as to prevent the nozzles 40 from drying, and the like.

What is claimed is:

1. An ink-jet printer, comprising:

a tank including an ink storage chamber and an inlet;

a cap;

a cover configured to move between a first position and a second position farther from the inlet than the first position; and an arm configured to locate the cap at an inlet closing position and an inlet opening position, wherein under a condition that the cap is in the inlet opening position and the cover is in the second position, the arm holds the cap in a state that the cap does not contact with the cover, and wherein under a condition that the cap is in the inlet opening position, a part of at least one of the cap and the arm is in the moving locus of the cover between the first position and the second position.

2. The ink-jet printer according to claim 1, wherein under a condition that the cap is in the inlet closing position, the cap and the arm are entirely out of the moving locus of the cover between the first position and the second position.

3. The ink-jet printer according to claim 1, wherein the arm includes a biasing member configured to bias the cap toward the inlet opening position.

4. The ink-jet printer according to claim 3, wherein the biasing member is a spring.

5. The ink-jet printer according to claim 1, wherein under the condition that the cap is in the inlet opening position and the cover is in the second position, the arm does not contact with the cover.

6. The ink-jet printer according to claim 1, wherein the cover is farthest away from the inlet in the second position.

7. The ink-jet printer according to claim 1, wherein the cap is located only by the arm in the inlet opening position.

8. The ink-jet printer according to claim 1, wherein under the condition that the cap is in the inlet opening position and the cover is in the second position, the arm holds the cap in a state that the cap does not contact with the inlet.

9. The ink-jet printer according to claim 8, wherein under the condition that the cap is in the inlet opening position, the arm is configured to locate the cap away from a virtual line which extends through a center of the inlet along an orthogonal direction orthogonal to a virtual plane including peripheries of the inlet.

10. The ink-jet printer according to claim 9, wherein under the condition that the cap is in the inlet opening position, the arm is configured to locate the cap away from any virtual line which extends through the inlet along the orthogonal direction.

11. The ink-jet printer according to claim 1, wherein the cover is configured to swing between the first position and the second position.

12. The ink-jet printer according to claim 11, wherein the arm extends straight along a direction orthogonal to a swing axis of the cover.

13. The ink-jet printer according to claim 1, wherein the arm includes a cap holding portion and an end, and wherein the arm is configured to locate the cap at the inlet closing position and the inlet opening position with the end being a center of movement of the arm.

14. The ink-jet printer according to claim 13, further comprising a housing, wherein at least a part of the tank is located within the housing, and wherein the end of the arm is connected to at least one of the housing and the tank.

15. The ink-jet printer according to claim 1, wherein in a state that the cover is in the first position, the cap is not accessible from outside of the ink-jet printer, and wherein in a state that the cover is in the second position, the cap is accessible from outside of the ink-jet printer.

16. The ink-jet printer according to claim 1, wherein in a state that the cover is in the first position, the cover covers the inlet, and wherein in a state that the cover is in the second position, the cover exposes the inlet.

17. The ink-jet printer according to claim 1, wherein under a condition that the cap is in the inlet opening position, the arm in an upright position holds the cap such that the cap is in the moving locus of the cover between the first position and the second position.

18. The ink-jet printer according to claim 1, wherein a movable area of the cap held by the arm is fully included in the moving locus of the cover between the first position and the second position.

19. The ink-jet printer according to claim 18, wherein a movable area of the arm is fully included in the moving locus of the cover between the first position and the second position.

* * * * *